United States Patent [19]

Wallace et al.

[11] 4,187,545
[45] Feb. 5, 1980

[54] ARTICLE ORIENTATION DETERMINING APPARATUS

[75] Inventors: John M. Wallace, Kewaunee; Gerald A. Pitner, Appleton, both of Wis.

[73] Assignee: Frank Hamachek Machine Company, Kewaunee, Wis.

[21] Appl. No.: 882,288

[22] Filed: Feb. 28, 1978

[51] Int. Cl.² ............... G01B 11/10; A01F 11/06
[52] U.S. Cl. .................... 364/559; 130/6; 356/386; 364/478; 364/552
[58] Field of Search ............ 364/469, 559, 552, 554, 364/478; 130/4, 5, 6, 9 A, 9 B, 9 C, 9 E, 9 F, 9 R; 356/158, 160, 385, 386, 387

[56] References Cited

U.S. PATENT DOCUMENTS

| | | | |
|---|---|---|---|
| 3,131,699 | 5/1964 | Cover et al. | 130/9 A |
| 3,455,307 | 7/1969 | Ross et al. | 130/9 R |
| 3,513,321 | 5/1970 | Sherman | 356/386 |
| 3,685,519 | 8/1972 | Cover et al. | 130/9 A |
| 4,105,925 | 8/1978 | Rossol et al. | 356/386 |

FOREIGN PATENT DOCUMENTS 974328  9/1975  Canada ........................... 364/559

*Primary Examiner*—Errol A. Krass
*Attorney, Agent, or Firm*—Ralph G. Hohenfeldt

[57] ABSTRACT

Article orientation determining apparatus is exemplified in apparatus for determining if the tip ends of corn cobs are leading or trailing as they advance toward a kernel cutter head. The cobs pass between a column of sequentially pulsed radiation emitters and corresponding detectors which scan successive slices of the article and develop binary data indicative of the number of emitters that are unblocked during each scan. A computer uses the data to determine orientation and provides signals for controlling devices that act on misoriented articles. Means are provided for reversing the machine to clear a jam condition, for setting the number of reversals, for setting minimum acceptable cob length, for testing operation and for performing other functions. The scanner head is constructed to resist hostile environmental conditions.

21 Claims, 15 Drawing Figures

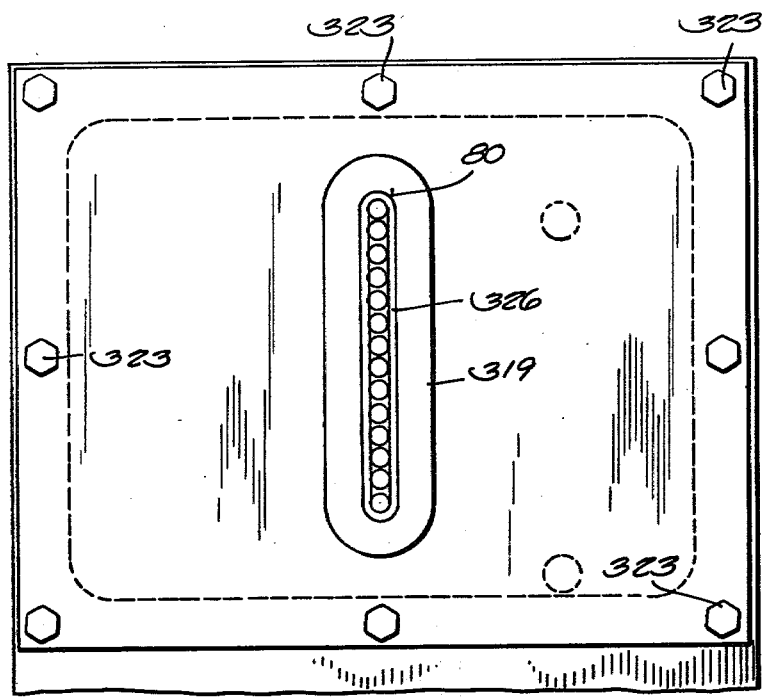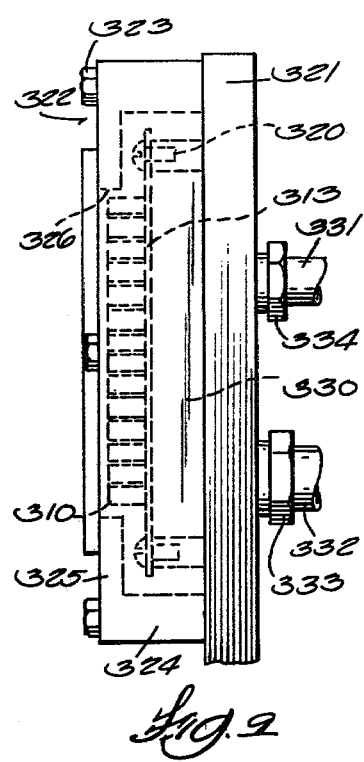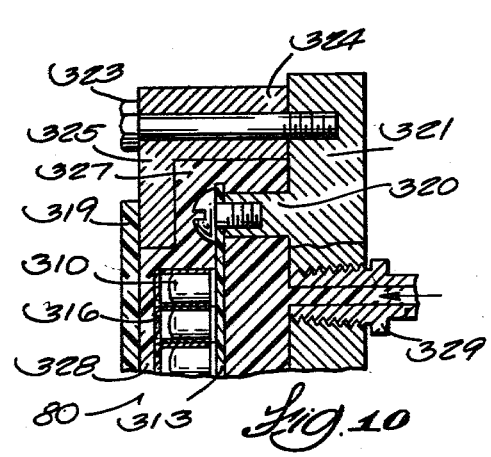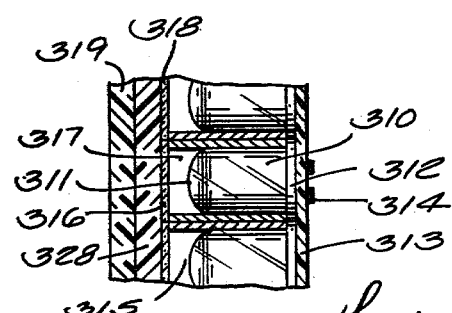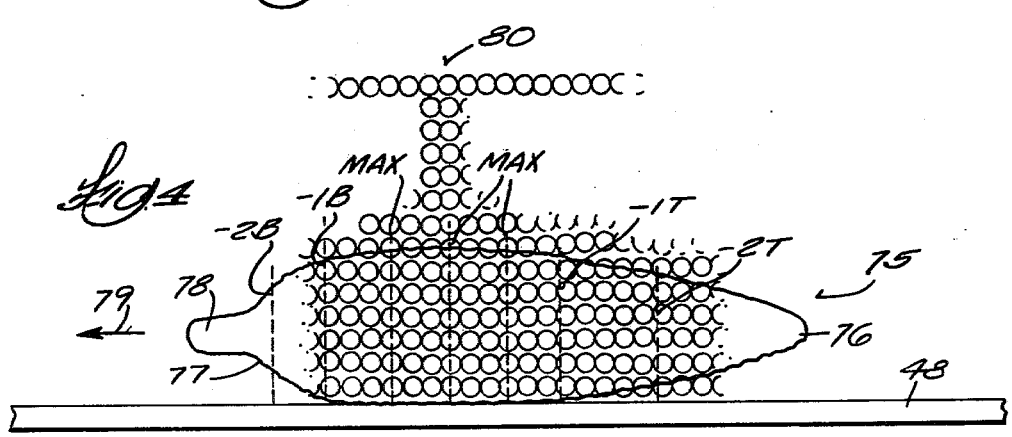

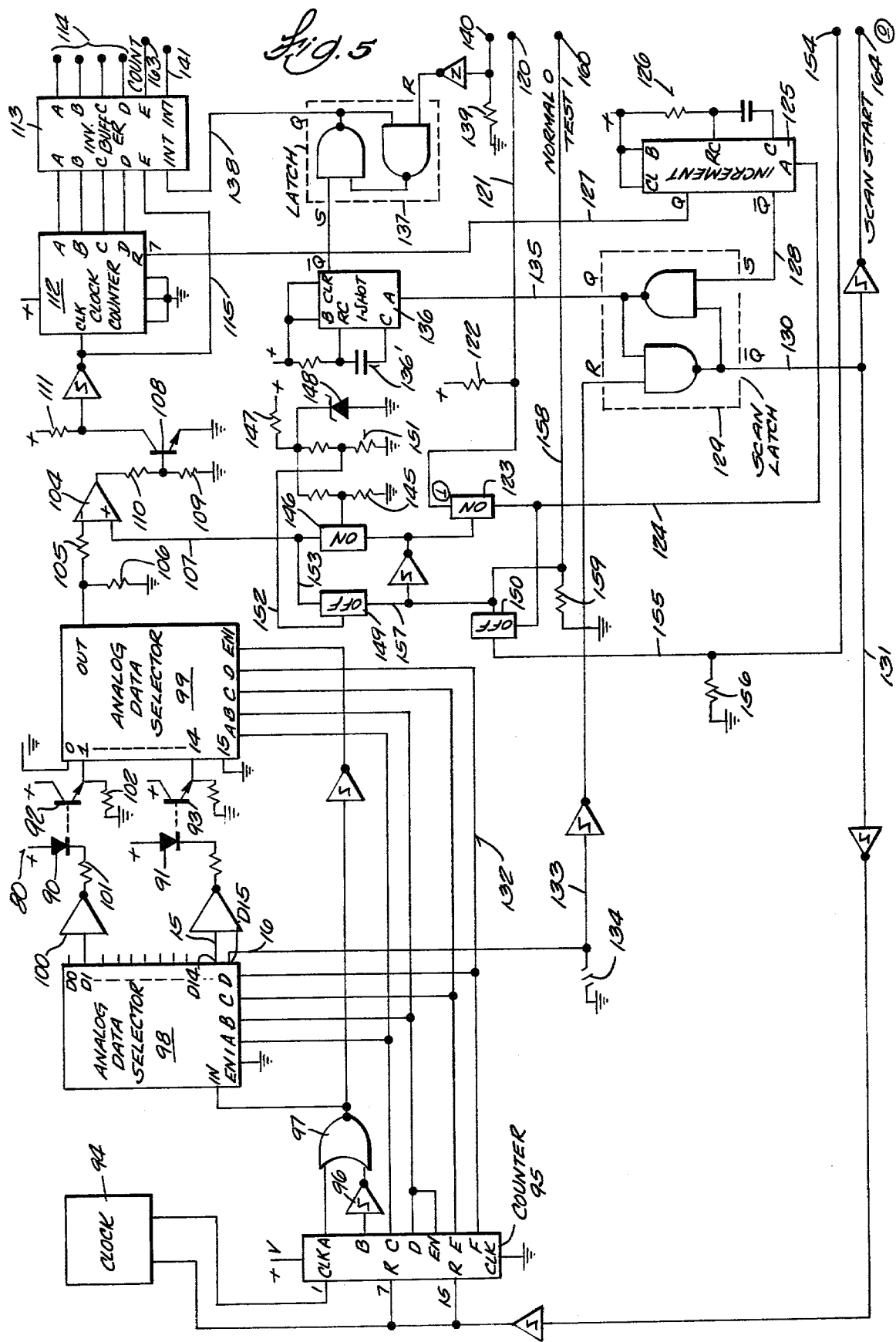

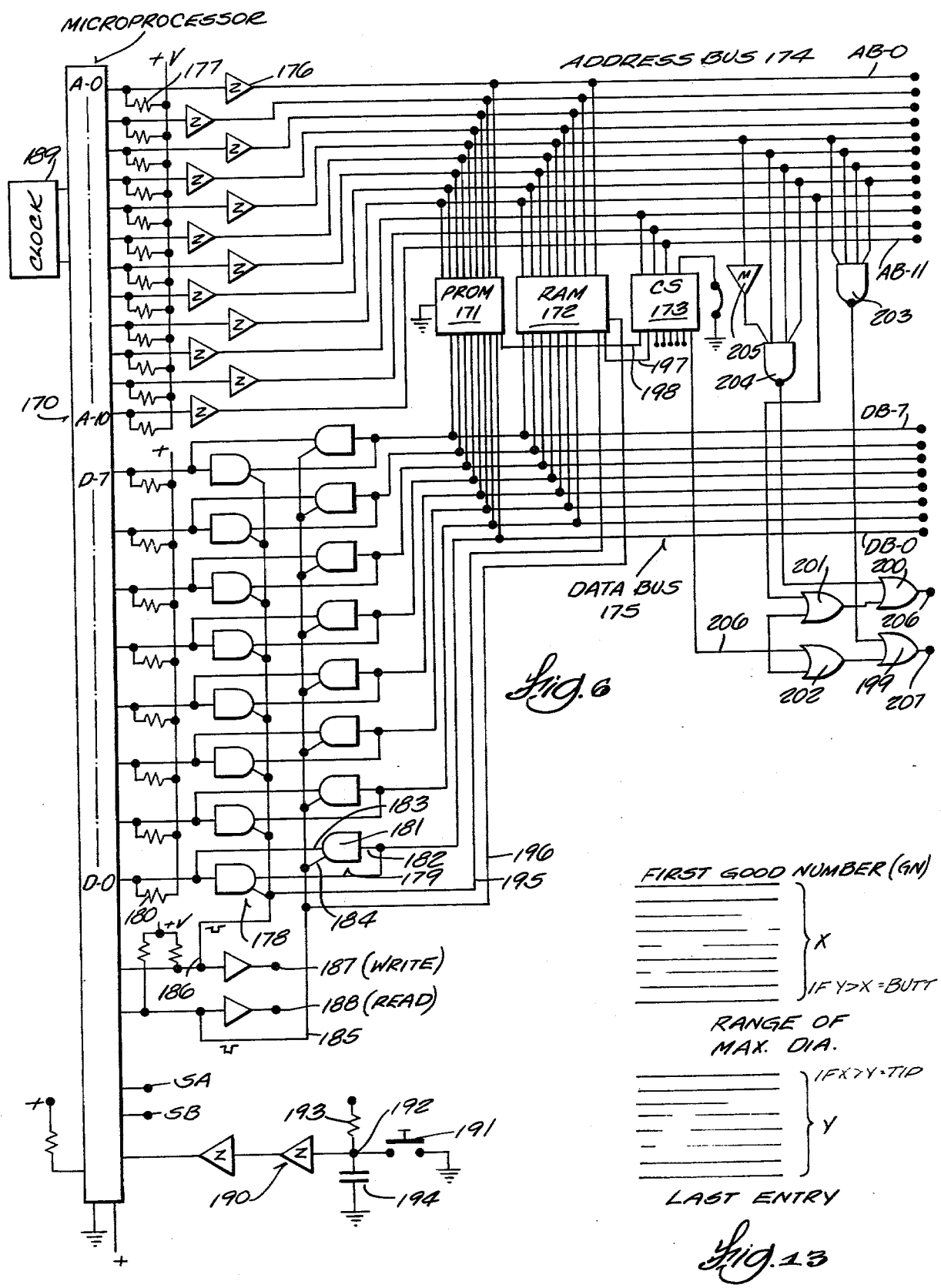

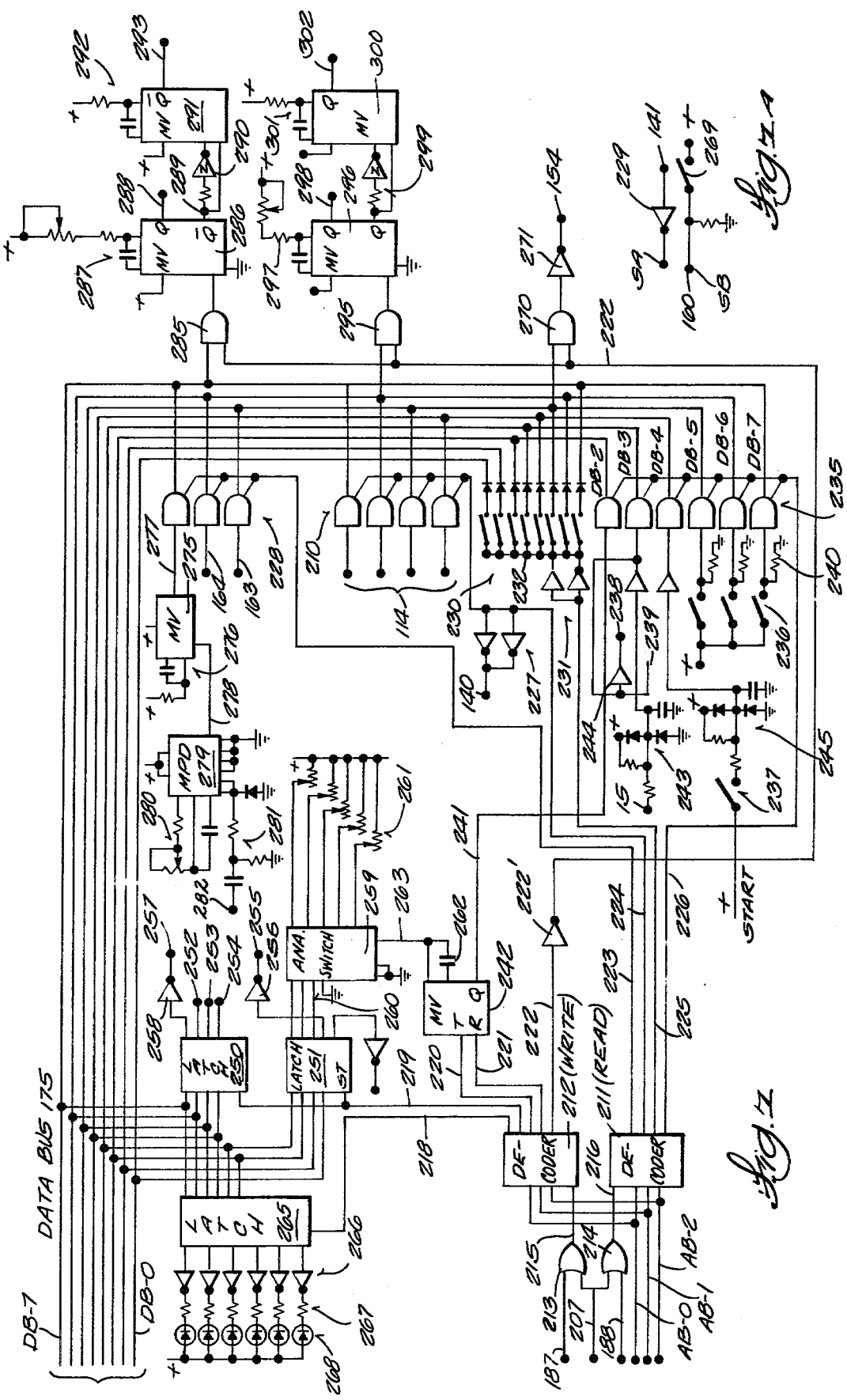

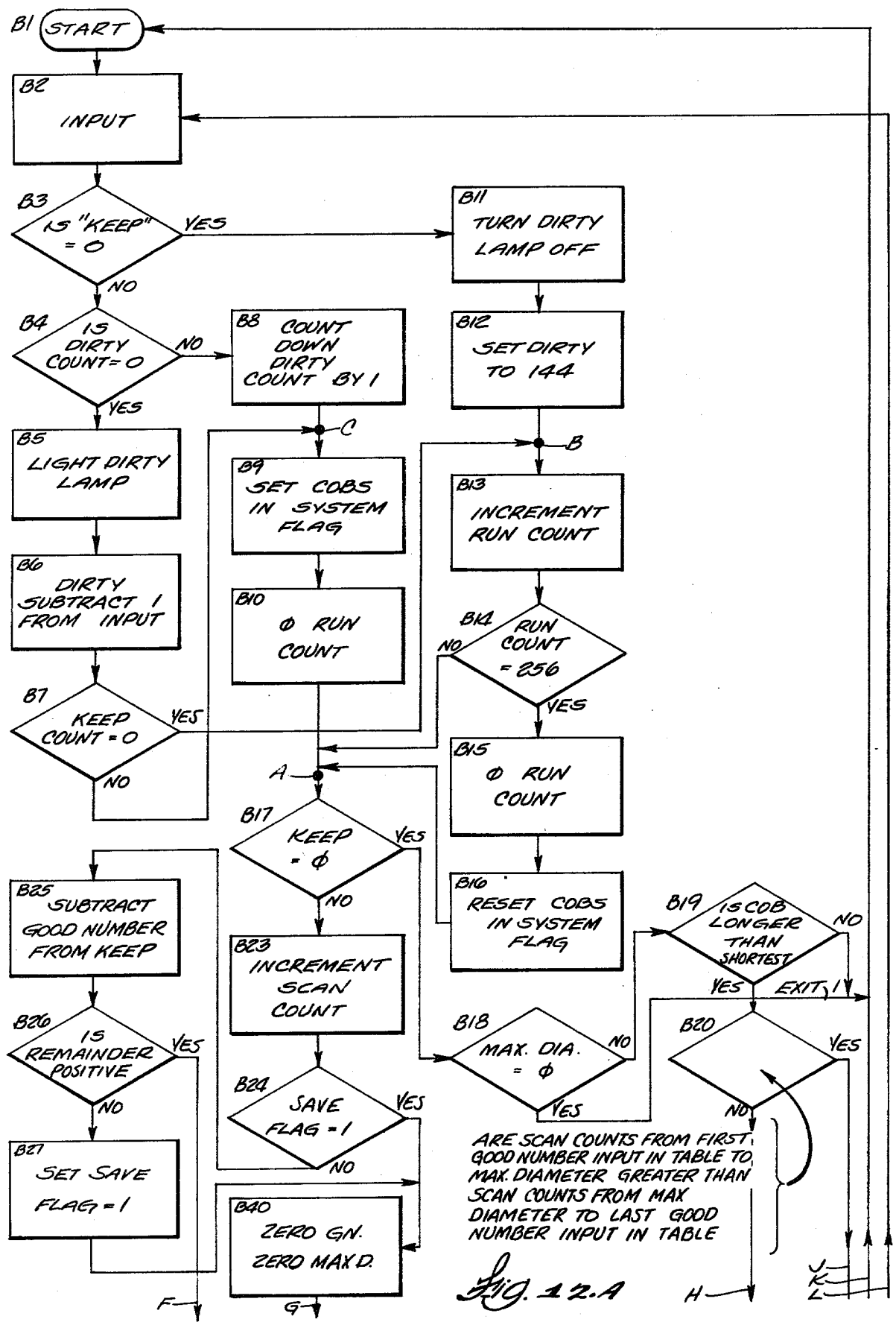

ARTICLE ORIENTATION DETERMINING APPARATUS

BACKGROUND OF THE INVENTION

This invention relates to apparatus for determining the shape and orientation of articles as they pass an inspection station.

A typical use of the apparatus is for determining if cobs of corn that are being conveyed toward a kernel stripper or cutter head are oriented such that their tips or small diameter ends are all leading and their large diameter or stem ends are all trailing as the cobs enter the cutter. It should be evident, however, from the description of an illustrative embodiment of the invention which will be given later that the invention may be used for determining the shape and orientation of various vegetables such as cucumbers, turnips and carrots and other non-food articles, too. For example, the invention could be used to properly orient articles that must enter a wrapping or packaging machine in a particular attitude.

In the food preserving industry, the corn kernels are usually cut from the cobs before the kernels are canned or fast frozen. The type of cutter heads most commonly used are those which are obtainable from FMC Corporation. These heads have several rotating knives which provide a central opening in which the corn cobs enter for the cutting or stripping operation. The head performs more efficiently if the tip ends, that is, the small ends of the corn cobs enter the cutter first. Hence, it has been customary to have workers place cobs of corn manually onto a conveyor chain that feeds to the cutter head. The cobs are always oriented by the workers so that the cob tips or more tapered and smaller diameter ends will be leading. This is an extremely tedious task as is well known. A principal aspect of the present invention is to provide apparatus for identifying the cobs which are wrongly oriented and for controlling a device which orients the cobs or any article properly. It is self-evident that arranging the cobs in the proper orientation automatically would be highly desirable.

It has been proposed to pass corn cobs along a plurality of closely adjacent spring biased fingers which, by contacting or not contacting parts of the cob along its length, produce information that is indicative of the orientation of the cobs. Such as sensor could be used in with a device that turns misoriented cobs end-for-end in response to information signals from the sensor. Contact sensing, however, is viewed as being inherently unreliable and insufficiently fast because movement of mechanical parts are involved.

SUMMARY OF THE INVENTION

In accordance with the present invention, a steady flow of husked corn cobs are conveyed in single file through an inspection station on their way to a cutter head. The inspection station, in the preferred embodiment, comprises means for holding a column of light emitters, such as light emitting diodes (LEDs), which direct their beams across the path that is traversed by properly and improperly oriented corn cobs. A corresponding column of light responsive elements or sensors such as phototransistors (PTs), light activated silicon controlled rectifiers (LASCRs) or photodiodes are located on the other side of the path to receive and sense those beams from the emitters which pass the cob. In a sense, the beams scan the cob transversely or, in other words, in planes to which the longitudinal axis of the cob is perpendicular. Transverse scans are made at equal increments along the length of each cob as the cobs pass between the column of emitters and the column of sensors. In this way, data is obtained relative to the diameter of the cob at various longitudinal increments. The apparatus uses a microprocessor to control acquisition and interpretation of the data. The data for one cob is stored at least as long as it takes for the full length of a cob to get through the scanning beams and, essentially simultaneously, the microprocessor by virtue of its program, operates on the data to determine whether the leading or trailing end of the cob has the larger or smaller diameter. If it is determined that the tip or smaller diameter end is trailing, the microprocessor outputs a signal for controlling a device that inverts or turns that particular cob end-for-end before it enters the cutter.

In addition to having the basic means for determining the orientation of objects, the new apparatus has means for solving other problems connected with feeding objects into a machine such as corn cobs into a cutter. For instance, means are provided for sensing when the cutter head becomes jammed, in which case the feed mechanism of the machine is reversed to effect automatic clearing of the cutter head. Then the machine is restored to its normal operating mode. Reversal and restoration are both automatic.

Another feature of the invention is to overcome the problems that arise as a result of the adverse environmental conditions in which the apparatus operates. In corn processing machinery, which is used herein to illustrate the new sensing apparatus, high humidity usually prevails and the apparatus usually becomes wetted and spattered with organic matter after running for a short period of time. The problems of designing sensing apparatus for use in such a hostile environment is aggravated by the fact that the apparatus must be washed after every few hours of operation in order to remove the tenacious film of organic matter which accumulates on the surfaces of the equipment. To comply with sanitary regulations, steam or water jets or mixtures of steam and water are directed against the surfaces at extremely high pressure. Pressures as high as 900 pounds per square inch are used sometimes. It should be evident, too, that deposition of foreign material on optical sensors as herein proposed, might impair their operation in due course such that they too must be subjected to the same cleaning procedures as other parts of the equipment. Moreover, it should be evident that deposition of large fragments of solid foreign material might completely occlude some of the sensors so that there would be a tendency to develop invalid data at any time between cleaning operations.

Accordingly, another object of the new sensing apparatus is the manner in which it is made resistant to the effects of accumulation of foreign matter and to the effects of the cleaning operations described above.

Another object of the apparatus is that means are provided for enabling periodic tests to determine if the article orientation sensor is reasonably clear of foreign matter and is otherwise functioning properly.

Still another object of the invention is to improve safety conditions by providing a master control for disabling all electric circuits that could result in the machinery being operated inadvertently at a time when the machine is being entered for repair or maintenance.

How the foregoing and other more specific objects of the invention are achieved will appear in the more detailed description of a preferred embodiment of the invention which will now be set forth in reference to the drawings.

DESCRIPTION OF THE DRAWINGS

FIG. 4 is a diagram that is useful for describing how the determination is made as to whether the cobs are advancing toward the kernel cutter with their small diameter ends leading as they should be;

FIG. 5 is a diagram of that part of the circuitry which is involved in scanning cobs to develop data used by the microprocessor central processing unit (CPU) to determine cob size and orientation;

FIG. 6 is a diagram showing the microprocessor and its peripheral devices;

FIG. 7 is a circuit which interfaces with the circuits of FIGS. 5 and 6; FIG. 8 is a front elevation view of the scanner head;

FIG. 9 is a side elevation view of FIG. 8;

FIG. 10 is a partial vertical section taken centrally of FIG. 8;

FIG. 11 is a vertical section showing how the LEDs in the scanner head are mounted and encapsulated;

FIG. 13 is a diagram of a table formed in memory during a cob orientation scanning sequence.

DESCRIPTION OF A PREFERRED EMBODIMENT

Figure 1:
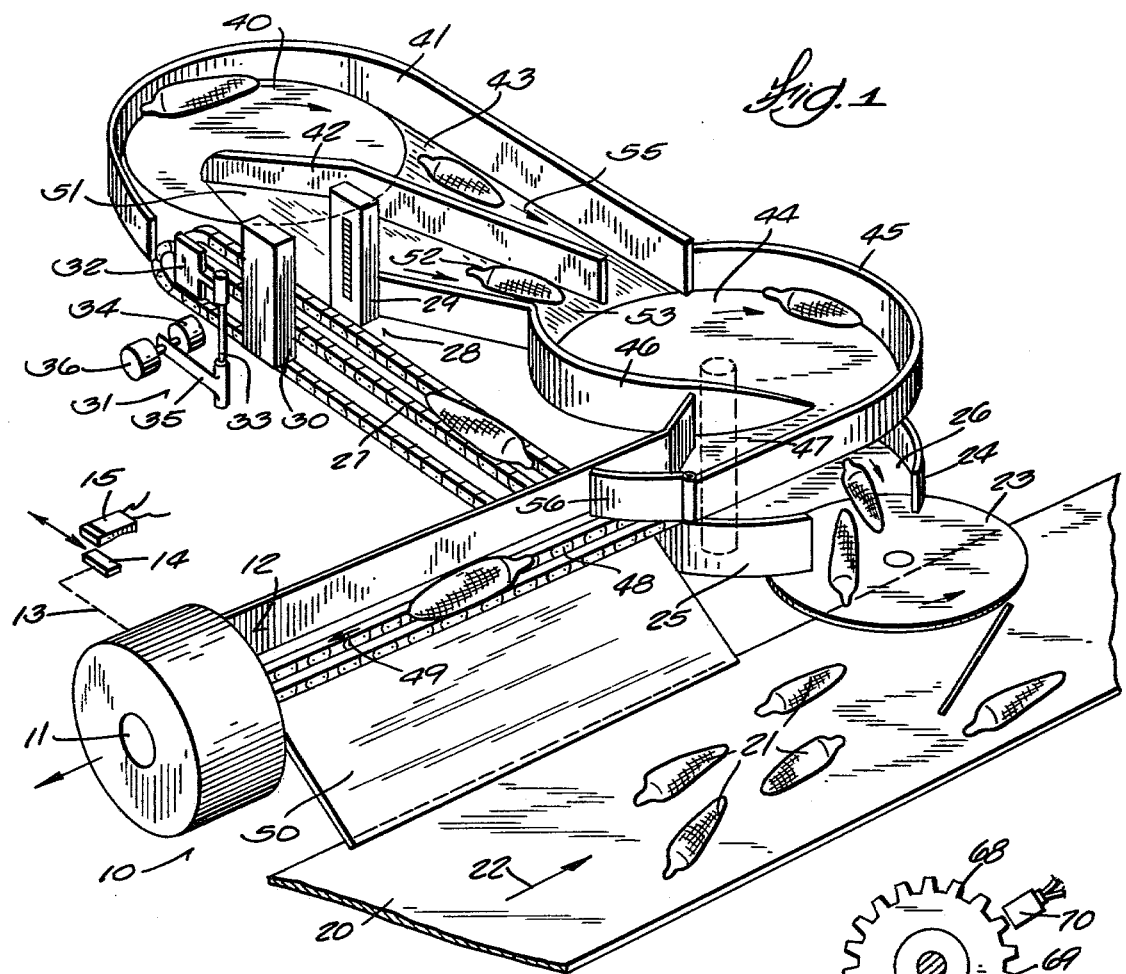
FIG. 1 is a diagrammatic perspective view of a corn cob kernel stripping machine with which the new cob orientation determining and reorienting control system is associated.

A corn cob kernel stripping machine exemplifying the new article orientation inspection and control system is shown diagrammatically in FIG. 1. In the output stage of the machine, there is a kernel cutter or stripper head which is generally designated by the reference numeral 10. Within the cutter head 10 are a group of rotating cutters, not visible. Cobs which have been stripped of kernels exit through an opening 11 and go to a waste receptacle. The means for collecting the stripped kernels are not shown. The input end, where the husked corn cobs enter the cutter head 10, is designated with an arrow marked 12. The corn cobs must enter the cutter head with their tips or small ends first.

As is well known, the FMC Corporation cutter head which is used for illustration, comprises longitudinally displaced sets of guide rollers. Each set has an upper and lower roller on spindles whose axes are transverse to the line of travel of the cobs. The rollers are power driven for advancing the cob through the kernel cutter which is in the head. The rollers are spring loaded. When the rollers open and close due to a cob passing through between them, a linkage, symbolized by the dashed line 13, is actuated. The linkage carries a ferrous metal part 14. When part 14 rises, incidental to ejection of a stripped cob, it actuates a magnetically susceptible proximity switch 15 which changes its state or puts out a signal which is used in the control system as will appear later. Switch 15 is also involved in detecting when the cutter head 10 is jammed as will be discussed later. The drive motor system for the cutter head is not shown in FIG. 1. The cutter head itself is assumed to be a popular type obtainable from FMC Corporation. Of course, other types of cutter heads could be substituted.

In FIG. 1, the husked corn cobs are delivered to the machine on a conveyor which is shown fragmentarily and is marked 20. Several ears of corn 21 are shown proceeding toward the machine in the direction of arrow 22 on the conveyor 20. Normally, some of the corn ears will be oriented with their tips first or leading and others will have their tips trailing. The machine shown in FIG. 1 has new means for determining the orientation of the cobs and means for correcting the orientation of those which are misoriented by turning them end-for-end.

In FIG. 1, the approaching corn cobs run onto a rotating disc 23, where they are turned into a circular chamber defined by walls 24 and 25. The bottom 26 also constitutes a rotating and vibrating disk on which the corn cobs are received and may be accumulated. Disk 26 advances the incoming corn cobs in single file onto a continuous translating conveyor chain 27. At this time, the corn cobs may be variously oriented, that is, some may have their tips or small ends leading and their larger butt or stem ends trailing while others in the succession are reversely oriented.

The region marked 28 is an inspection station where orientation of the cobs is determined. The major elements of the inspection station are a photoemitter assembly 29 and a photoresponsive assembly 30. These elements constitute the inspection station scanner. They participate in determining orientation of the cobs as will be discussed in more detail later. Cobs which are determined to be misoriented when in the inspection station 28 are turned end-for-end in the machine so they go to the cutter head 10 in the proper way. The first step in the turn around process is to kick the misoriented cobs out of the succession of incoming cobs. This is done with a kicker device which is generally designated by the reference numeral 31 and is shown in its inactive state. The kicker device comprises a paddle 32 which is carried on a shaft 33. Paddle 32 is caused to impact and eject misoriented corn cobs with a solenoid operator 34 which is coupled to shaft 33 by means of schematically represented linkage 35. Another solenoid operator 36 is used to restore paddle 32 to its inactive position, as shown, as quickly as possible so it will be ready to kick out the next corn cob if it is misoriented. Typically, the cobs are conveyed through the inspection station 28 at a linear speed of about 35.9 inches per second so the orientation determination and kicker action must be carried out very rapidly.

Cobs which are determined to be properly oriented in the inspection station are not kicked or otherwise acted upon but are allowed to proceed to a continuously turning disk 40 which is surrounded over a major part of its circumference by a guide wall 41. A portion of wall 41 in conjunction with a vibrating wall 42 forms a channel 43 through which the properly oriented cobs progress toward another vibrating disk 44. Disk 44 is partially surrounded by side walls 45 and 46 which define a cob exit port 47. When the cobs pass through exit port 47, they are picked up by a conveyor chain 48 which transports the cobs in the direction of arrows 49 toward the cutter head 10 where they are stripped of their kernels as explained earlier. Conveyor chain 48 is driven independently of other parts of the machine so that conveyor chain 48 may be reversed to withdraw corn cobs that jam at the input end of the cutter head as they might if they are badly misaligned as they approach the cutter head. The cutters are also reversible to aid in ejecting jammed cobs. Jammed cobs which are withdrawn concurrently with reversal of conveyor 48 are allowed to spill down a ramp 50 onto oscillating conveyor 20 and they are recycled.

Cobs which pass through inspection station 28 with their large butt ends instead of their smaller and more tapered tip ends leading are, of course, kicked out of the row of cobs by kicker paddle 32. These cobs land on a planar area 51 which is vibrating as are some other parts of the machine during normal operation. Vibration induces the cobs to move in the direction of the arrow headed line 52. It should be apparent that if the butt end of a particular cob was leading as it progressed to the left in FIG. 1 on conveyor chain 27, the butt end would be trailing after being kicked off by kicker paddle 32. A kicked out cob then advances in the direction of arrow 52 with its tip leading. Due to the shaking or vibrating action, the formerly misoriented cobs pass through a port 53 and are deposited on rotating and vibrating disk 44. The cobs which were originally properly oriented as described earlier and not kicked out at the inspection station flow in the direction of the arrow headed line 55 onto disk 44 and their tip ends arrive on disk 44 first as do the tip ends of the cobs following the path that is coincident with arrow headed lines 52. Thus, all cobs are carried around disk 44 with their tip ends first so they pass out of an exit port 47 and onto conveyor chain 48 in this orientation. There is a spring biased gate 56 disposed across exit port 47 which allows cobs to come out from pan 44 but prevents anything from returning to the disk such as might otherwise happen when conveyor chain 48 is reversed as it is to clear a jam condition.

Figure 3:
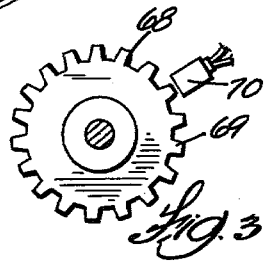
FIG. 3 is a diagram of one type of sync pulse generator that may be used in the system.
Figure 2:
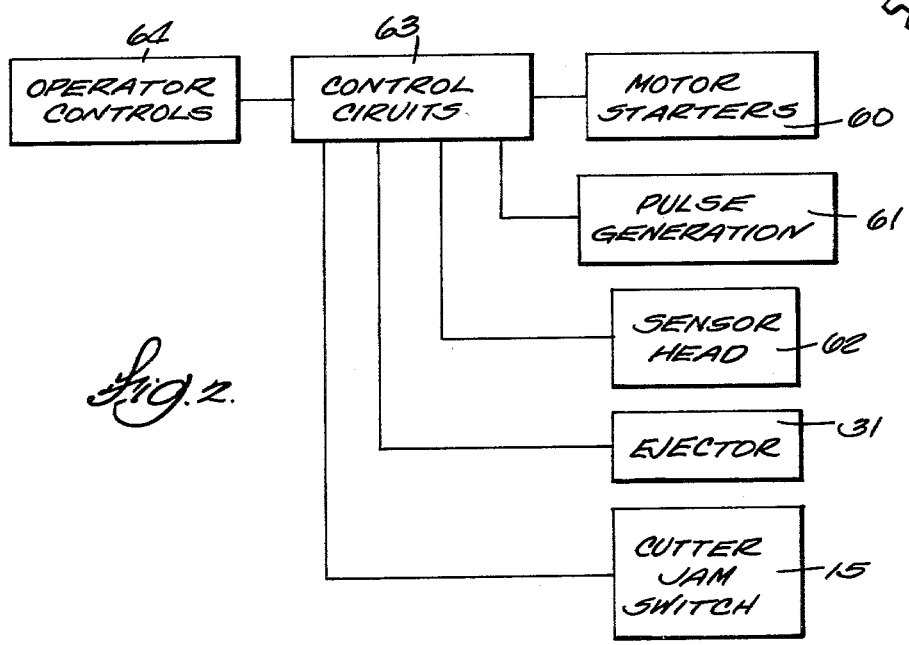
FIG. 2 is a generalized block diagram of the control system.

Refer now to FIG. 2 for an overview of the electrical features of the cutter feed apparatus and the article orientation apparatus which was discussed in general terms above. In FIG. 2, a box marked 60 collectively designates the motor starters for various motors, not shown, that are used for effecting cutter operation, conveyor operations, disk rotation and vibration in the machine of FIG. 1. The block marked 61 symbolizes a timing or snyc pulse generator which is used for synchronizing the entire system and has particular pertinence to the components associated with the inspection station. The sync pulse generator 61 may take a variety of forms. It may be a purely electrical pulse generator such as a crystal controlled oscillator, for instance. In this example, sync pulses are developed by using a rotating ferrous metal toothed wheel 68 as shown in FIG. 3.

The teeth 69 of wheel 68 are circumferentially spaced from each other. They rotate past a proximity switch 70 which changes state or produces a sync pulse each time a tooth on the rotating wheel aligns with it. Thus, a reproducible train of equally spaced pulses are produced for synchronizing the system. By way of example, and not limitation, in an actual embodiment, sync pulses having a duration of a few microseconds are produced every 3.6 milliseconds. This is in a machine where the cobs are traveling to the kernel cutter at about 35.9 or about 36 inches per second. Use of the sync pulses will be explained more fully later when the orientation determination and control system is described in greater detail.

Continuing with the FIG. 2 block diagram, the system includes the inspection station sensor head or scanner which is symbolized by the block marked 62. This sensor head is located at the inspection station 28 in FIG. 1 and should be construed as including the photoemitter assembly 29 and photosensitive assembly 30 of that figure. In FIG. 2, the ejector or kicker device is designated by the reference numeral 31 as it is similarly generally designated in FIG. 1. The cutter jam switch which was marked 15 in FIG. 1 is similarly marked in FIG. 2. This was described as a magnetic proximity switch in connection with the general description of the machine relative to FIG. 1 but any suitable switch or sensor such as a photoelectric sensing device could be used in place of a magnetic switch.

In FIG. 2, a block marked 63 symbolizes various control circuits used in the apparatus. In the actual machine, these control circuits are in a water and dirtproof box that is at some distance from the machine to minimize exposure to the rigorous cleaning procedures which were mentioned earlier. The control circuits include a microprocessor and peripheral devices used for processing signals from the scanner or sensor head 62 to determine if the corn cobs are properly or improperly oriented. As will be explained later, the microprocessor and its peripherals are involved in inputting, processing and outputting a variety of signals related to orientation and control functions of the machine.

The block diagram in FIG. 2 also shows a block marked 64 which symbolizes the operator controls. As will appear later, the operator controls include switches for starting and stopping the machine on command and for carrying out a test routine that determines if the orientation sensing system and other electrical circuits are functioning properly. The operator controls are in a water-proof box near the machine.

The manner in which the corn cobs are inspected at inspection station 28 in FIG. 1 to determine if they are advancing toward cutter head 10 with their tip end or butt end first will now be discussed in greater detail. As mentioned earlier, at the inspection station, the cobs are scanned by the beams from a column of light emitters such as LEDs in an emitter assembly 29 and the beams are sensed by phototransistors or the like for developing data as to the configuration and orientation of the cobs.

Refer to FIG. 4 which depicts a corn cob 75 as it is passing through inspection station 28. As is self-evident, the tip end 76 of a typical cob has long taper as compared to the butt end 77 which tapers toward the stem 78 of the cob more abruptly. Thus, the butt end 77 or stem end 78 is the large diameter end and the tip end 76 is the smaller diameter end on most normally developed corn cobs.

In FIG. 4, cob 75 may be considered to be moving in the direction of the arrow 79 from right to left on conveyor chain 27 through inspection station 28. Thus, for the sake of example, an assumption will be made that the cob is misoriented, that is, its butt end 77 is leading when its tip end 76 should be leading as it advances toward cutter head 10.

In FIG. 4, the columns and rows of small circles are representative of the LEDs in the emitter assembly 29. In reality, there is only one column 80 containing 14 LEDs which is passed during the scanning operation by each moving corn cob, but explanation of the relative movement between the cobs and the column of LEDs is facilitated by having it appear that the column of LEDs is being translated instead of the corn cob. As will be elaborated later when the specific calculating and control circuitry is being described, the LEDs in column 80 in this illustrative embodiment are energized sequentially from the top to the bottom of the column at repeated intervals as a cob progresses through the beams emitted by the LEDs but scanning could be in the opposite direction if desired. The effect is to scan or look at the diameters of successive slices of a cob at equal increments along its length. By way of example, and not limitation, in an actual machine, a transverse scan of a cob's diameter is made for every ⅛ inch of cob length.

As mentioned earlier, there is a light detector assembly 30, see FIG. 1, which is adjacent the conveyor chain 27 on which the cobs are transported through inspection station 28. Assembly 30 is on the side opposite of the path followed by the cobs from light emitter assembly 29. The light detector assembly 30, as will be described in more detail later, has a column of light sensing elements, such as phototransistors, corresponding in number with and aligned with the column of light emitters 80 or LEDs. Whether the output signal state of a light sensor is high or low depends upon whether the beam directed toward it from an emitter is blocked at the time of a scanning readout. It will be evident, of course, that the number of light sensors that do not receive a pulse of light during a scanning cycle will be governed by the diameter of the cob at the particular slice in which the scan is being made at the moment. Fewer light sensors will receive light pulses at the bottom end of the sensor column during a scan when a large diameter slice of the cob is in the emitter beams than will receive light pulses when the smaller diameter tip end of the cob is in the beam.

The system could be designed for having all of the light emitters or LEDs in the column turn on and off simultaneously for each successive slice. However, it is advantageous to pulse the light emitters or LEDs on in a sequence from top to bottom, in this example, since then only one LED is on at a time and instantaneous electric power consumption and dissipation is reduced. Moreover, cross talk between beams is avoided.

In this embodiment, the LEDs in column 80 are actually of the infrared radiation emitting type and the light sensors are, of course, of a type which affords maximum response or greatest sensitivity to infrared radiation. It is an important feature of the invention to use infrared devices since radiation in that band penetrates water and other contaminants, that might deposit on the emitters and sensors during machine operation, better than shorter wavelength radiation. Consequently, the machine and sensing apparatus can be run for a longer period of time without the necessity of the operator having to stop it to wipe off contaminants in order to get valid data for determining cob orientation. How the light emitter assembly 29 and light sensor assembly 30 are constructed in a unique way to enable use of infrared radiation will be described later.

As further background information, when the tip or stem end of a cob advances into the beam path, the system is initialized and scanning for valid pulse counts begins. And, as explained above, adjacent increments or slices of the cob are scanned consecutively until the opposite end of the cob is reached and taking of data is stopped for that cob. The data in each scan is in the form of pulse counts from the light sensors. When a large diameter slice of a cob is in the beam, light pulses will be received by all sensors from all emitters in the column that are above the level of the cob periphery at that particular slice and the remainder of the sensors in the column will not be pulsed because they are blocked by the intervening cob. It will thus be evident that for each scan, data can be obtained that is indicative of the diameter of the cob at that particular slice. As will be explained more fully later, the counts for each slice are stored in a semiconductor memory matrix or random access memory in a pattern corresponding with a pattern in which the counts were taken. A microprocessor is programmed for analyzing the data and determining if the butt end or the smaller tip end of the cob being inspected is leading. If the tip end is leading, nothing happens because the cob is properly oriented in accordance with this example. If the large butt end is leading, the microprocessor through performing proper calculations, makes this determination and provides an output signal which is operative to actuate the double solenoid kicker 31 to cause the cob to be kicked out of the path of the others and turned around so that it can be reentered in the proper orientation before reaching the cutter head 10. Information in the memory is written over when the next cob passes through inspection so previous data is ignored.

Before entering into a detailed description of the electrical circuitry of the apparatus and other novel features, reference is made again to FIG. 4 for a further discussion of the data acquisition and utilization process.

When the tip or butt end of the cob crosses the light ray path from the column of LEDs 80 in FIG. 4 scanning is initiated and continued until all increments or slices over the length of the cob are scanned. Scanning of a cob may be terminated on a time basis or in response to the infrared beams from all of the LEDs becoming unblocked as a result of the cob having passed. The number of LEDs which are counted as being blocked for each scan are stored in digital form in a memory matrix that is associated with a microprocessor and its peripherals constituting a central processing unit (CPU) which will be described in detail later. Any LED-to-photosensor beam which is at least one quarter unblocked causes that photosensor to change state as if it were totally unblocked, in this embodiment.

The CPU is programmed to examine all data stored for a cob and to determine the extent or zone of the maximum cob diameter. In this embodiment, when the processor finds three consecutive counts that are equal, it determines that this is the zone of maximum diameter and uses it as a reference for determining the taper and, hence, the orientation of the cob. For instance, in FIG. 4, the three consecutive counts indicated by the dashed lines labeled MAX (maximum) all have the same value several scans or slices apart. Thus, in the MAX range, seven LEDs in column 80 are blocked and the CPU takes into account all of the sevens. The processor then examines the counts on each side of MAX to determine in which direction the counts descend most rapidly. In one direction, it finds where the count or number of LEDs blocked are one and two counts less than MAX. As in FIG. 4, going from MAX toward the tip or small diameter end of the cob, it determines, for example, at the diameter indicated by the dash-dot line labeled −1T, the count is one less than MAX and this is at a counted number of scans away from MAX. At −1T, only six LEDs are blocked. Similarly, the processor finds where the number of unblocked LEDs is two less than MAX as indicated by the dash-dot line labeled −2T and corresponds with five LEDs being blocked for this particular cob diameter and shape. The CPU determines that this is also a certain number of scans away from MAX.

In the other direction, that is, from MAX toward the butt or large diameter end of the cob, the processor also finds the scans where the number of LEDs blocked are one and two fewer than MAX as at −1B and −2B, respectively. More scans occur between MAX and −1T and −2T where the cob diameter is diminishing or tapering markedly toward the cob tip than occur where it is tapering less toward the butt end as between MAX and −1B and −2B so the processor can make suitable calculations using this data to determine which way the cob is oriented. Note that count data preceding −2B and following −2T is ignored and only data between −2B and −2T is used so the orientation determination is independent of cob length.

Now that the fundamentals of the cob orientation determination process have been described, a more detailed description of the electronic system for obtaining cob size data and for controlling various machine functions can be undertaken starting with FIG. 5.

In FIG. 5, near top-center, the column of light emitting devices which in this example are infrared emitting diodes are designated generally by the reference numeral 80. Laser beams could also be used. Only the uppermost 90 and lowermost 91 of the LEDs in the emitter assembly are shown but it will be understood that, in this particular example, these are 14 LEDs in the column. Adjacent the column of LEDs is a corresponding column of photosensitive devices such as phototransistors, the upper one of which is marked 92 and the lower one is marked 93. The corn cob under examination passes through the beams between the LEDs and corresponding phototransistors as described earlier in connection with FIGS. 1 and 4. As implied earlier, scanning involves turning on the LEDs from 90 to 91 in sequence to obtain responses from the phototransistors 92-93 in accordance with whether they are blocked or unblocked by the incremental length of the corn cob that is in the cross beams during the particular scan.

The scanning system in FIG. 5 is controlled by a clock pulse generator symbolized by the block marked 94. The scan must be completed within 3.6 milliseconds so the pulse generator runs at a faster rate such as 80 kHz. The The clock drives a counter 95. The counter divides the output pulses from the clock to a slower rate. For example, each vertical scan is done in about 300 microseconds. Pins A and B of the counter 95 change state at the beginning of each counting cycle and act through two lines, one of which includes a Schmitt trigger 96, to trip a gate 97 whose output goes high to enable a pair of analog data selectors 98 and 99. The analog data selectors may be type CE4067. Concurrently with the enable signal, a series of counts constituting binary address words are put out from the counter 95 on its output pins marked C, D, E and F. The consecutive addresses are supplied to the data selectors 98 and 99 to their respective sets of input pins A-D for synchronous operation. The first in the sequence of addresses causes data selector 98 to furnish an analog signal from its output pin D1 to an inverter-buffer 100 which sinks current from LED 90 through a limiting resistor 101, thereby turning LED 90 on momentarily. Ensuing addresses from counter 95 similarly cause the 14 LEDs 90-91 to turn on and off in sequence and provide the scanning function. The phototransistors 92-93 become conductive and nonconductive, respectively, in correspondence with its cooperating LED turning on and off. Each phototransistor has a current limiting resistor typified by the one marked 102.

At various places in the circuitry, Schmitt triggers, such as the one marked 96 adjacent counter 95, are inserted. Since they are all for the purpose of squaring up or sharpening digital signals and are indicated by the same symbol as 96, the remainder of them will not be given reference numerals nor will they be discussed.

Data selector 99 puts out a series of pulses in correspondence with sequential energization of the phototransistors 92-93 during each scan cycle. In a practical embodiment, the output pulses from selector 99 must be above a 1.0 millivolt level to be considered valid. They are supplied to comparator 104 which is an operational amplifier and includes an input network comprised of resistors 105 and 106. A reference voltage of about 1.0 millivolts is supplied by way of a line 107 of the noninverting terminal of amplifier 104. Thus, only pulses from data selector 99 which exceed 1.0 millivolt are capable of triggering operational amplifier 104 which is configured as a voltage comparator. As will be explained, the reference voltage level on line 107 is changed when the system is put in a test mode. For the time being it is sufficient to note that for every phototransistor 92-93 that is triggered during a scanning sequence, an output signal is produced by comparator 104 such that a level changing driver transistor 108 is triggered for every detected light pulse. This transistor has a bias divider comprised of resistors 109 and 110 and a collector resistor 111. Changes in the state of the collector voltage on transistor 108 in response to consecutive input pulses serves as a clock for another pulse counter 112 which may be a type CD4520. Binary words representing the number of counts and, hence, the number of blocked photosensors in a scan, are put out on the output pins A-D of counter 112 and these signals are fed to the input of an inverter buffer 113. The binary words representing the pulse counts are inverted in buffer 113 so that, in reality, it is the number of LEDs that are unblocked which is represented by the binary word put out by the inverter buffer 113 on its output pins marked A-D and delivered to a corresponding set of lines that are marked 114 collectively. These lines connect with the data bus of the CPU system in FIG. 7 and enable the counts for each scan to be delivered to the proper address in the memory matrix of a random access memory which is a peripheral of the CPU as will be explained. Every scan of each incremental length or slice of a cob results in a binary word representing the number of unblocked LEDs sent to the CPU for analysis. If the CPU determines that the data is useful in the algorithm used for calculating cob shape, the data is stored. Then the counting circuit of FIG. 5 recycles for the next cob.

The scan for each slice or increment is started in response to occurrence of a sync pulse that is provided by proximity switch 70 for every gear tooth that passes it as mentioned in connection with FIG. 3. A suitable electronic clock, not shown, having a pulse rate synchronized with conveyor speed could be substituted for the gear-type sync pulse generator for synchronizing scanning and computation. By way of concrete example and not limitation, in an actual machine, a scan is initiated every 3.6 ms or every ⅛ inch of cob length. The manner in which the system is reset to distinguish the scans for one cob from preceding and following cobs will be discussed in due course but first initiation and termination of the individual scans will be explained.

Assume temporarily that the scanning and counting circuit in FIG. 5 is initialized and ready to begin scanning a cob that has just entered the beam path from the LEDs to the photosensors. One of the sync pulses from proximity switch 70 will be supplied at this time to conveyor increment terminal 120 at the right side of FIG. 5, thus causing line 121 to go low in this particular circuit. Line 121 is held high normally with a pull-up resistor 122. This low going signal is conducted through an analog switch 123 and then by way of line 124 to a one-shot multivibrator (MV) 125, marked "increment" to designate its purpose, which is thereby triggered. Multivibrator 125 may be a type 74C221. Its RC time constant network is generally designated by the numeral 126 and its connections to pins CL, B, RC, C and so forth may be obtained from manufacturers' data sheets on CMOS devices. When MV 125 is triggered, its Q output pin goes high or to logical 1 and this resets or zeros counter 112 by way of line 127. The $\overline{Q}$ output pin of MV 125 goes to logical zero or low and, by way of line 128 leading to a set pin S of a flip-flop 129, sets the Q output pin of this flip-flop high and the pulse from one-shot MV 125 disappears. When flip-flop 129 changes state, its $\overline{Q}$ output pin goes low and this signal is delivered by way of lines 130 and 131 to the reset pin R of clock pulse counter 95, thus enabling this counter to enable the analog data selectors 98 and 99 and to deliver addresses to address lines 132 and to effect a top to bottom vertical scan of a cob increment. When analog data selector 98 has cycled the 14 LEDs and reaches its 15th position, indicating the end of a scan, its output pin 16 goes high. This signal is fed via line 133, which has a pull-down resistor 134, to the reset pin R of flip-flop 129, thus causing $\overline{Q}$ pin to this flip-flop to go high again and the Q pin to go low again.

The Q output of flip-flop 129 is connected by way of line 135 to pin A of a one-shot multivibrator 136, called the interrupt MV. It has an RC timing network 136'. Its output pin Q is connected to the set pin S of a flip-flop 137 called an interrupt latch. The Q output pin of flip-flop 137 is connected, with a conductor 138, to the interrupt pin INT of inverter buffer 113. The reset pin R of flip-flop 137 is connected to a pull-down resistor 139 and through a Schmitt trigger to a reset signal input terminal 140 that receives a high going signal from the CPU at the end of each vertical scan. When the $\overline{Q}$ pin of one-shot MV 136 goes low at the end of a vertical scan, the low going signal is applied to the reset pin S of flip-flop 137, causing its Q output pin to go high, thus sending a signal through INT pins of inverter buffer 113 and output terminal 141, which constitutes an interrupt signal to the CPU, indicates that data is ready to be read out. At the end of each vertical scan readout, the CPU sends a high going signal to reset terminal 140 which causes interrupt latch flip-flop 137 to reset so its Q output pin goes low until the next scan is completed.

As indicated earlier in reference to FIG. 5, the signals from analog data selector 99 must be at least about 1.0 mv to be considered valid counts by exceeding the reference voltage on line 107 and thereby tripping comparator amplifier 104. During the normal run mode this reference or threshold voltage is obtained from the top of a voltage divider 145 which supplies the run mode reference voltage through an analog switch 146. The divider has a current limiting resistor 147 and its voltage is regulated by a zener diode 148. Both analog switches 146, supplying the reference voltage, and 123 supplying the scan start or conveyor increment signal to one-shot MV 125, are turned on during the normal run mode. Another pair of analog switches 149 and 150 are turned on during the run mode but are turned on while analog switches 123 and 146 are turned off during a system test mode which will now be discussed preliminarily.

Operating in the test mode is for determining if the LEDs and photosensors in the cob scanner are functioning and unimpaired by dirt and if the system is otherwise operating without missing any counts. Basically, this involves applying a much higher reference voltage to comparator operational amplifier 104 by way of line 107. This results in strong signals being required before amplifier 104 will trip to produce countable output signals. For instance, the reference voltage on line 107 is desirably raised to 300 mv during test as compared with about 1.0 mv during normal operation. A dirty LED, for example, would produce a signal at the output of analog data selector 99 which might not be sufficient to trip the comparator amplifier 104 and this can be detected by a missing pulse detector to reveal the defect as will be discussed more fully later.

The high, such as 300 mv test reference voltage is obtained from a voltage divider 151 that is coupled with divider 145 which is used only during the run mode. The mid-point of divider 151 connects by way of a line 152 to analog switch 149. During test, analog switch 149 is turned on so the high reference voltage is applied to line 107 by way of line 153. Switch 146 is turned off as is switch 123 but analog switch 150 is turned on.

Switching to the test mode results from the CPU applying a high going signal to input terminal 160 of line 158 which has a pull-down resistor 159. This signal switches analog switch 150 which, in turn, causes analog switch 149 to close by way of a signal over line 157 and it opens analog switch 123 by way of a signal through the Schmitt trigger. When analog switch 149 becomes conductive, the high analog reference voltage is coupled to line 107 to increase the threshold of comparator amplifier 104 as explained above.

When the CPU puts a low going pulse on input terminal 154 and line 155 which has a pull-down resistor 156, through the now conducting analog switch 150 to line 124, this pulse is finally transmitted to pin A of a multivibrator 125 which is marked "increment" and which initiates each test scan then in a fashion similar to the run mode scanning process described earlier with the difference that, as explained, a 300 mv test reference voltage is applied to the comparator 104 instead of the 1.0 mv run mode reference. The CPU will look at the results of this and any consecutive scans to insure that all 14 of the LEDs 90–91 were unblocked. If there is any count error, the CPU will take action which will cause the malfunction to be indicated as will be described later. The sequence of pulses from the scanner during the test mode, when no cob is in the LED beams, is detectable on output pin E of inverter buffer 113 which leads to output terminal 163 and to the CPU where the counts are processed. Hence, the CPU is able to determine if any LED or phototransistor is dirty or if there is any other component failure in the system.

Before leaving FIG. 5, it should be noted that there is an output terminal 164 which leads from scan latch flip-flop 129 $\overline{Q}$ output. This terminal also goes high at the start of each vertical scan. The purpose of this is to permit the CPU to determine when the test scan started and when it ends since line 164 goes low again, due to action of flip-flop 129, when the test scan ends. The merit of this is that in the test software provision is made for testing the time of the scan against the maximum allowable scan time.

The central processing unit (CPU) is shown in FIG. 6. The circuit in this figure is interconnected with the scan control circuit of FIG. 5 which has been discussed and with the control circuitry of FIG. 7 which will be discussed later.

Figure 12B:
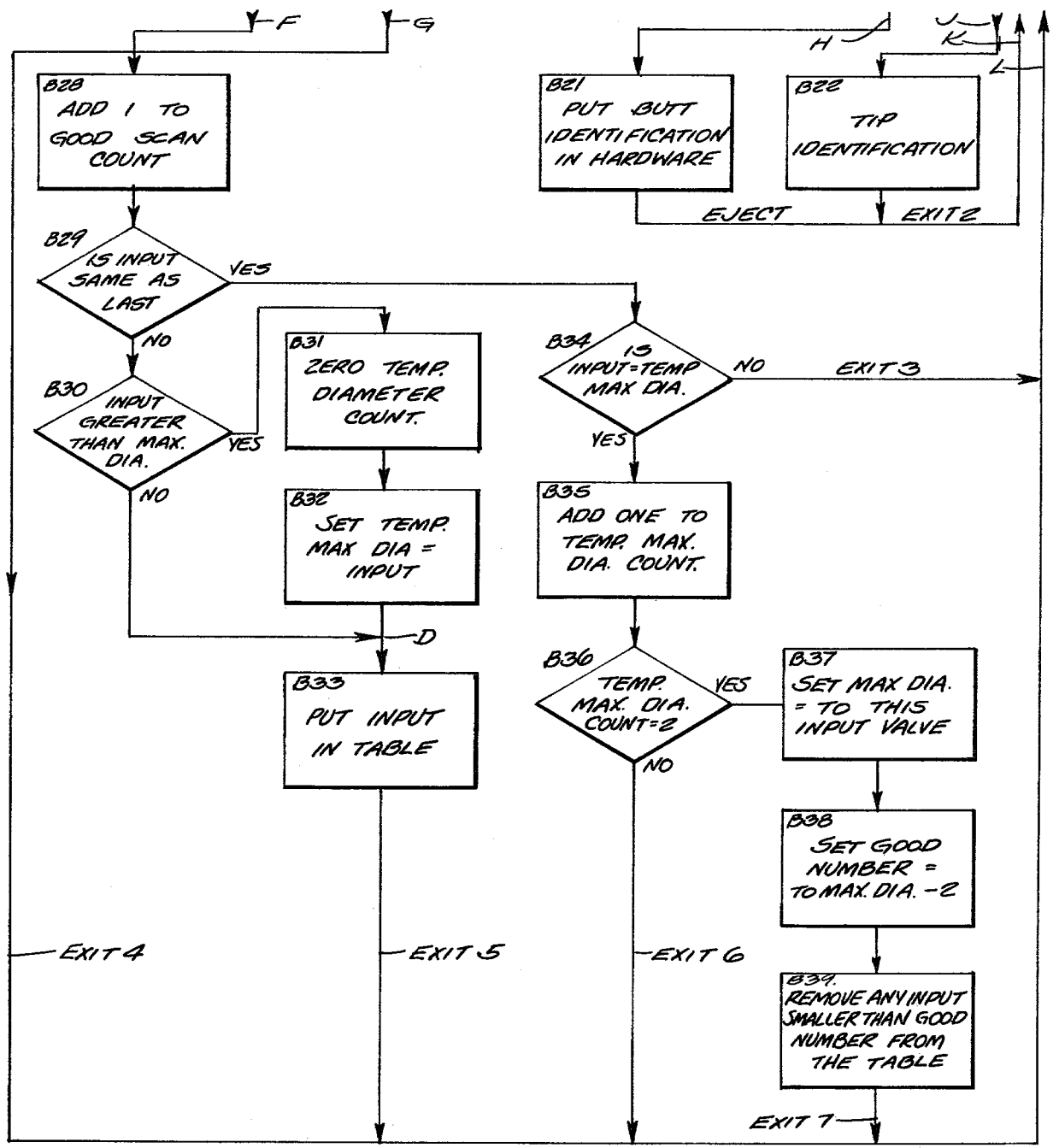
FIG. 12, comprised of parts 12A and 12B, is a flow chart for explaining how cob orientation data is processed.

The central processing unit (CPU) of FIG. 6 comprises a microprocessor symbolized by the long rectangle marked 170. The commercial embodiment uses a SC/MPII microprocessor 170, made by National Semiconductor Corporation but other microprocessors could be used too as will be understood by those who are skilled in the art. The instruction set for the SC/MPII is set forth in instruction manual Publication No. 42630529-001A dated November 1976, and titled 1SP8A/600 Single chip 8-bit n-channel microprocessor. A reasonably skilled programmer can program the microprocessor to perform the functions which are incidental to operation of the system, so the whole program will not be set forth in detail. However, the program flow chart for making the cob orientation and dimension determinations in the inspection station is shown in FIG. 12 and will be discussed later.

Included in the CPU of FIG. 6 are microprocessor peripheral devices and buses. One such device is a programmable read-only memory (PROM) 171, which in the actual equipment is composed of several similar units to obtain the necessary storage capacity. The program or microprocessor instructions are stored in PROM 171. There is also a random access memory (RAM) 172, shown as a single unit, for storing data as is conventional in data processing systems. Also provided is a chip select (CS) device 173 which is controllable by the microprocessor to select the PROM and RAM chips as required to access or insert data and instructions during operation. PROM 171 and RAM 172 each connect to a multiconductor address bus 174 and to a data bus 175. The address buses lead from pins A-0 to A-10 of the microprocessor 170. Each address bus line has a buffer in series with it, such as the one marked 176. Each line is also connected to a pull-up resistor such as the one marked 177.

The data input and output pins on the microprocessor 170 are marked D-0 to D-7. Data is exchanged between the microprocessor and data bus 175 lines through three-state gates or buffers whose output pins can be in a low or high output state or in a high impedance state at which time they are blocked from transmitting signals. One column of buffers, which are enabled when the microprocessor is instructed to write or send data out over data bus 175, is marked 178. The other column of buffers, which are enabled when the microprocessor is instructed to receive data from the data bus, is marked 179. Each data bus line has a pull-up resistor in it such as the one marked 180.

As is shown to those familiar with three-state logic, a typical buffer 181 has an input 182, an output 183 and a control gate line 184. All control gates 184 in column 179 are connected to a common control line 185. A signal level change effected by the microprocessor on line 185 enables all buffers in column 179 so that if data is on the data bus at that time it will be read by the microprocessor. At this time, the control line 186 for the other column of buffers 178 would remain in its original state and the outputs of these buffers would exhibit their high impedance state so they would not conduct the data. To write data out of the microprocessor onto the data bus lines, DB-0 to DB-7 the signal state on line 186 is changed to enable all of the buffers in column 178. Thus, even though data may exist on the data bus or the output pins D-0 to D-7 of the microprocessor much of the time, there will only be transfer of data by the bidirectional buffers when the microprocessor instruction dictates that the data should be written or read. In this particular design it is when the control lines 185 or 186 are strobed negatively that the respective buffer columns are enabled.

In FIG. 6, the write strobe signal also appears on terminal 187 and the read strobe signal appears on terminal 188. These terminals connect with similarly labeled terminals in FIG. 7 and are used for purposes which will be explained later.

The microprocessor 170 in FIG. 6 is timed by a clock which is shown as a block marked 189. At the lower end of the microprocessor is a circuit, generally designated by the reference numeral 190, which is for manually clearing and resetting the whole CPU system when desired by pressing a reset switch which grounds the mid-point of a resistor 193 capacitor 194 circuit and imparts a negative going strobe pulse to the microprocessor through the Schmitt triggers in this circuit. This reset pulse is also put in for power-up initialization.

It should also be noted in FIG. 6 that when the write strobe pulse is applied to control line 186 to turn on the three-state write buffers in column 178, this strobe signal is also sent, by way of line 195, to RAM 172 to enable it to receive data. When the read strobe pulse is applied to control line 185, it is also sent, by way of line 196, to enable RAM 172 so data can be read from it. At such times, of course, the proper addresses are delivered by the microprocessor to the RAM over address bus 174. At this time the proper address is also delivered on bus 174 to the chip select CS 172, so it will select either the RAM or PROM banks with suitable signals over select lines 197 and 198.

Also on the CPU card shown in FIG. 6 is an address decoder circuit comprises of OR gates 199-202, NAND gates 203 and 204 and an inverter 205 connected as shown. The signal on output pins 206 and 207 occurs by software control and is required for addressing functions which will be discussed later.

In FIG. 6, the 12 address bus lines are marked AB-0 to AB-11 reading from top to bottom lines. The eight data bus lines are marked DB-0 to DB-7 reading from bottom to top. These markings are for indicating where the lines are connected into other circuits in other figures where the connection point is similarly marked.

Attention is now invited to FIG. 7 for a discussion of how the binary words, indicative of the number of LEDs 80 that are unblocked and dealt with as blocked in the CPU algorithm, are processed before the cob orientation and configuration is calculated. The discussion will show how the FIG. 5 part of the circuitry interfaces with FIGS. 6 and 7. As indicated in FIG. 5, the binary words representing counts of unblocked LEDs are sent out on four lines 114. These lines are similarly marked in FIG. 7 as the inputs to a group of four three-state buffers 210 which permit the microprocessor to read in the binary words from the scanning head. At the left of FIG. 7, there is a decoder 211 which gets addresses from the microprocessor when it is necessary to read information into memory. Another decoder 212 is active when it is necessary to write information from memory or other source into the system. A pair of OR gates 213 and 214 are in the decoder input circuits. The input lines for the code words are marked 187, 207, 188, AB-0, AB-1 and AB-2.

Consider processing a write address. When the microprocessor wants to send a write address to the FIG. 7 circuit, a logic low is applied on EF(X) address line 207 and line 187 would be low, causing the output line 215 of an OR gate 213, which is configured as a NAND gate, to go low. This enables the write address decoder 212 to decode the binary address on the three low order address bus lines AB-0 to AB-2. The decoder 212 then decodes the address on these bus lines and makes one of its output lines 218 to 222 go low, initiating a write command to one of various devices in the circuit as will be explained.

Consider a read address. When the microprocessor wants to send a read address to the FIG. 7 circuit, lines 188 and 207 would go low, causing the OR gates 214 output line 216 to go low. This enables read address decoder 211 to decode the binary address on the bus lines AB-0 to AB-2. Decoder 211 then decodes the address on these buses and makes one of its output lines 223–226 low, initiating a read command to one of several devices in the circuit as will be explained.

As stated, data corresponding with the number of unblocked LEDs for each vertical scan of a cob slice is supplied by way of lines 114 to the three-state buffers in a group 210 in FIG. 7. This data is transferred to the CPU 170 by way of data bus 175 in response to a read signal on line 224 as described above. Line 224, which enables the three-state buffers 210, also provides a concurrent signal to the adjacent inverter pair 227 whose output pin 140 goes high each time a data word is read into memory. This is the same pin 140 in FIG. 5 that accepts a reset signal after each scan. When pin 140 goes high, it resets the interrupt latch 137 in FIG. 5. This latch is initially set on completion of the scan to signal the CPU that there is a new word on lines 114. The line is reset because the word has been read.

The data ready interrupt signal on line 141 from inverter buffer 113 in FIG. 5 is supplied to similarly marked pin 141 in FIG. 7A which is adjacent FIG. 7. This circuit has an inverter 229 and an input pin 141 and an output pin marked SA. Associated with this circuit is a switch 269 which is used for system test purposes as will be described. The output pin of this circuit is marked 160 and SB. Output pin SA of the inverter 229 connects to FIG. 6 input SA of the CPU 170. When the scanner in FIG. 5 completes a scan, it puts a low signal on line 141, causing SA of the CPU to go high, because of inversion. This causes a program interrupt to occur in the CPU so its program is interrupted momentarily while it accepts scan data.

Further in FIG. 7, there is a group of manually set switches 230, each in series with a diode, which are involved in setting the minimum cob length which will be considered in orientation calculations. If a cob is below a certain minimum length, it is not processed or turned around and simply goes through the scanner. The outputs, respectively, of switches 230 connect into the data bus 175 lines DB-0 to DB-7. Selectively closing the switches 230 provides the CPU with a binary number constant representative of the minimum cob length which it must consider in connection with orientation calculations. When the CPU requires this information, it delivers an address which is decoded by decoder 211 whose output line 225 would then go low. This low signal goes through inverter buffers 231 whose outputs 232 would then go high. This forms a binary word of zeros and ones on data bus 175. Whatever constant word representive of minimum cob length switches 230 are set to produce, is used by the CPU in the cob orientation calculations.

In further reference to FIG. 7, the CPU reads data which is presented to it for other purposes through a group of three-state buffers 235. The purposes of this data will be described momentarily. When the CPU is to address the buffers 235, it provides an address on the address bus and an address code to the inputs of read decoder 211. This causes output line 226 from decoder 211 to go low, thus inputting data to the CPU. The CPU has a number of options as to the functions it will perform which depend on the kind of data sent through three-state gates 235.

If the CPU looks at data bus 175, particularly lines DB-7, DB-6 and DB-5, the CPu would be looking at the settings of the three manually settable switches 236 which will now be discussed. These switches are set selectively in accordance with the number of times it is desired to have the cutter head reverse automatically in the event the cutter becomes jammed with cobs or other debris. Switches 236 can be closed selectively to produce a three digit word that is stored in RAM 172 for use when a decision on reversing must be made. Each of the switches in group 236 has a pull-down resistor such as the one marked 240 connected with it.

If the CPU looks at data bus 175 line DB-2, the CPU would be testing the state of the Q output of the timing device, namely, one-shot multivibrator 242 in FIG. 7 as will be explained later in connection with describing the reversing mechanism.

When the CPU looks at data bus 175 line DB-3, it is looking at the state of jam switch 15 of FIG. 1. The pin to the jam switch is marked 15 in FIG. 7. The jam switch signal is inputted through a voltage protection and filtering network 243 comprised of resistors, diodes and a capacitor as shown. This signal goes through a Schmitt trigger to the three-state gate which connects to DB-3. The same signal is also coupled to pin 238 through a buffer 244 and also to pin 239.

Pin 238 is an output to a central data collection device which could be used for counting the total number of cobs that go through the machine and that could be used for many other purposes too.

Pin 239 is an output to a mechanical counter, not shown, which can also count the number of cobs that have passed through the kernel stripping machine.

If the CPU looks at data bus 175 line DB-4, it is looking at the state of the system start switch 237 in the lower center of FIG. 7. When the start switch 237 is closed, a high or positive signal is fed through the filter and voltage protection network 245 comprised of reversed diodes, resistors and a capacitor as shown. This signal goes through a Schmitt trigger and to data line DB-4 through the three-state buffer when the buffer is enabled by a low signal on line 226 from the address decoder 211. This signal causes the CPU to go through the start-up sequence such as starting the conveyor motors and so forth.

The manner in which certain motors used in the machine, for example, the cutter head and conveyor motors are started when required will now be discussed. For this purpose attention is invited to output latches 250 and 251 in the upper left region of FIG. 7.

When the output line 252 of latch 250 goes high, the motor, not shown, for the cutter head 10 in FIG. 1 is caused to go into reverse as a result of the operation of some relays, not shown.

When the output line 253 of latch 250 goes high, the cutter head 10 motor, not shown, is caused to drive forward through some relays, not shown, being operated.

When output line 254 of latch 250 goes high, the motor, not shown, for driving the whole cob feeder mechanism of the machine is energized so cobs are conveyed toward cutter head 10. The three functions just described, are initiated, respectively, by the CPU putting a byte of data on data bus 175 corresponding with the function that is to be performed. When this byte of data is put out, the CPU puts out the proper address code by way of decoder 212 which causes its output line 219 to go low. Line 219 connects to the strobe pins ST of latches 250 and 251. When the strobe signal occurs, the data is latched and stays in output latches 250 and 251, thus causing said functions to occur.

An output pin 255 with a buffer 256 in series with it is controlled by latch 251 to provide power to an indicator lamp, not shown, which when energized tells the operator that the machine has shut down because of a jam condition which it could not clear within a set number of conveyor reversals. The decoding and addressing routine involved in this case has been exemplified in the preceding paragraphs and need not be repeated.

An output pin 257 coupled to latch 250 through a buffer 258 provides a signal to a dirty or blocked LED indicating lamp, not shown, but called a "dirty light" hereafter. The algorithm of the CPU governs turning on this lamp if at any time blockage of a scanning LED has occurred. This warns the operator to clean the scanning head. However the software of the system is such that blockage of only one LED will not necessarily result in invalid data because the algorithm is designed to account for blockage of one diode.

In FIG. 7, the combination of one-shot multivibrator 242, analog switches 259 and several variable resistors 261 constitutes a timing circuit for testing the times of various functions. The circuit operates as follows. The CPU can present an address on address bus lines DB-0 to DB-7 leading to latches 250 and 251 which address analog switch 259 by way of lines 260. In this manner, the variable resistors in group 261 are connected in circuit sequentially. The analog switch 259 has a common output line 263 which leads to a timing capacitor 262, which together with the selected variable resistor constitutes an RC timing circuit for one-shot multivibrator (MV) 242. The CPU starts the selection by putting out an address which causes trigger line 220 to MV 242 to go low and causes the Q output of this one-shot MV 242, supplying line 241, to go high. When the CPU wants to reset oneshot MV 242, it puts out an address which causes line 221 to go low.

To test the state of the MV 242 Q output by way of line 241, the CPU reads in the data that would cause decoder 211 output line 226 to go low, thus opening all of the three-state buffers 235, and then the CPU can look at the data bus line DB-2 and ignore the others. The CPU then senses the state and uses it in what ever subroutine is in progress.

Each variable resistor in group 261 has a different purpose and provides a different timing current to capacitor 262. The uppermost variable resistor in the group 261 is used for testing the jam switch 15 open time. The next lower resistor is for setting the time that the cutter head motor is allowed to coast down after a jam and prior to reversing the cutter head and the conveyor to clear the cutter. The next lower resistor is for governing the time that the cutter is running in reverse for clearing it after a jam condition. The next lower resistor is for governing the length of time the cutter motor and cutter is compelled to coast down after reverse drive is terminated. The lowermost variable resistor in group 261 is for causing the whole drive to go forward for a set period of time to determine if the cutter is cleared within this time. If it is not cleared, the system goes through its reversing cycle again. As explained earlier, the attempt to clear the cutter would finally be stopped, depending on how the switches 236 near the bottom of FIG. 7 are set.

A part of the test function of the system will now be described. In the upper left of FIG. 7 there is a 6-bit latch 265. It has outputs which feed through a group of inverter buffers 266 and a group of resistors 267 that feed to a group of indicators which in this case are light emitting diodes 268. Each of the LEDs in group 268 is for indicating which signals might be missing during a test. For example, one LED might indicate when a scan count is short due to a dirty LED in the inspection head; another indicates if the cob length switch 230 in FIG. 7 is erroneously set to all zeros; another indicates if the scan time of the LEDs in the inspection head is too long; another indicates if there is no counting at all by the monitoring point 163 in FIG. 5; and, another indicates that the scan end interrupt is missing due to a component failure and so forth. The signals provided to the LEDs in group 268 could be used as binary numbers for effecting additional controls or indications.

The test function starts by closing test switch 269 in FIG. 7A which sends a signal to the CPU pin SB labeled in FIG. 7A and on the CPU 170 in FIG. 6. Then the CPU starts providing consecutive code words on the data bus lines DB-0 to DB-7 to latch 250 in FIG. 7. At the same time, the CPU puts out consecutive addresses which are decoded in write decoder 212 and its output line 218 goes low for each code word that is to be displayed with the LEDs in group 268.

System testing with the LEDs in group 268 is initiated by using an AND gate 270 whose inputs are connected to data bus line DB-5 and line 222 in the far right region of FIG. 7. The output of gate 270 is connected through an inverter 271 to pin 154 which connects to a similarly marked pin in the lower right region of FIG. 5. Test scanning is initiated when the CPU puts a pulse on pin 154. The CPU addresses a negative write pulse to line 222 which leads from write decoder 212, to AND gate 270. Line 222 has an inverter 222' in it so one input to gate 270 then goes high. Coincidentally, if the CPU causes the data bit on DB-5 to be high, the output of gate 270 will go low and, due to inverter 271, pin 154 will pulse low for the period of the write pulse. The signal on pin 154 in FIGS. 5 and 7 starts the test scan which was previously described. The counts indicative of cob diameter are supplied during the test function, when there is no cob in the beam, of course, to data inputs 114 in FIG. 7 just as they are during the regular run mode as previously described.

Now to be described is how the CPU determines if a test scan has actually started by testing the state of pin 164, FIG. 7, which is associated with the group of 3 three-state buffers 228 that was mentioned earlier. The signal to input pin 164 comes from pin 164 in FIG. 5 which is called the scan start signal output. This signal originates at the $\overline{Q}$ output of scan latch 129 in FIG. 5. Pin 164 goes high at the start of a scan and goes low at the end of a scan. The CPU goes through the coding and addressing routine, described earlier, which results in line 223 from read address decoder 211 going high. This enables the three-state buffers 228 to which pin 164 connects so pin 164 can be sensed by the computer by way of data bus line DB-7. The CPU makes a determination depending on what the previous circumstances were.

Pin 163 which is an input to another three-state buffer in the group 228 in FIG. 7 gets its signal from the correspondingly marked count pulse pin 163 associated with inverter buffer 113 in FIG. 5. After a scan is started and a logic one level is on pin 164, that is, if it went high, the CPU tests pin 163 by way of DB-5 and counts the number of pulses until it sees pin 164 go low again, indicating the end of the scan. In this way the CPU tests to see that there were fourteen pulses, corresponding with the fourteen LEDs which are used for sensing cob size in this example. At the same time, the CPU compares the number of pulses it read in by way of data inputs 114 to see if the number of pulses counted agrees with the number that should have been counted. The lack of agreement is indicated as a fault by activating one of the LEDs in group 268 in FIG. 7.

A missing pulse detector circuit is provided for determining if the repetition rate of the pulses presented to pin 282 from the sync pulse generator switch 70 in FIG. 3 is proper as determined by timing network 280 of the missing pulse detector (MPD) 279 in FIG. 7. The sync pulse is fed in through a filter and voltage protection network 281. The time between pulses delivered to output line 278 is governed by the RC timing network 280. The sync pulse from switch 70 is also presented to conveyor increment pin 120 of FIG. 5 as described earlier. If the sync pulses are not at the proper repetition rate, an output will occur on line 278 of MPD 279 causing a oneshot multivibrator MV 275 to present a long duration pulse on its output 277. The duration of this pulse is determined by RC timing network 276. The CPU can read this condition through the uppermost three-state buffer in group 228 by way of data bus line DB-7. If the high output on line 277 does exist, the CPU causes a warning light, not shown, to be turned on to indicate that one or more sync pulses are being missed for various reasons.

The manner in which the cobs are sorted will now be described briefly in reference to FIG. 7 and later the manner in which the computations are made by the CPU for selectively sorting cobs or correcting their orientation will be described.

In the right portion of FIG. 7 there is an AND gate 285. When bit DB-7 of data bus 175 and line 222 from write decoder 212 both go high, the two inputs to gate 285 go high and its output goes low. Data bus line DB-7 and line 222 go high when the CPU has completed the calculations for determining the orientation of the cob that is in the scanner at that time. The code word and address procedure is similar to that which has been previously described. When the output of gate 285 goes high, it triggers a one-shot MV 286, causing its Q output 288 to go high for a duration determined by RC timing network 287. Line 288 from the Q output when high, is used to drive a solidstate relay, not shown, which energizes the coil 34 of ejector paddle 31 in FIG. 1 so that the misoriented cob is kicked out as described earlier.

After the Q pin ontime of one-shot MV 286 has expired, its $\overline{Q}$ pin 289 goes high again. This triggers the next one-shot MV 291 after a delay caused by the resistor and a Schmitt trigger circuit 290 which couples the output of MV 286 to MV 291. The Q pin 293 of MV 291 will then go high for a time determined by the RC timing network 292. Q pin 293 provides drive, through a solid-state relay, not shown, to the paddle return coil 36 of ejector 31 in FIG. 1. The delay assures that the ejector coil 34 and return coil 36 do not oppose each other.

Another circuit including AND gate 295, and one-shot MVs 296 and 300 is provided for additional functions such as sorting cobs on the basis of their lengths, diameters, or other aspects. This circuit is comparable to the one described in the previous paragraph. In this case the gate 295 has its inputs connected to data bus line DB-6 and to trigger line 222. When both inputs go high due to an address on DB-6 and decoder line 222, the output of gate 295 goes high so the Q output line 298 of MV 296 goes high for a duration determined by timing network 297. After the time expires, the $\overline{Q}$ output goes low and this triggers multivibrator 300 through Schmitt trigger circuit 299, thus causing Q output 302 of MV 300 to go high. The signals on the Q outputs 298 and 302 may be used to perform various functions that are dictated by whatever address the CPU is programmed to provide.

Before describing the manner in which the CPU is programmed to determine cob orientation, the manner in which the LEDs used for scanning the cobs are mounted will be described in reference to FIGS. 8–11. Earlier, it was pointed out that all parts of the machine are frequently washed with high pressure water or steam to rid them of organic residue. The scanning LEDs are also susceptible to being undesirably coated with foreign material and, would necessarily have to be subjected to the same cleaning treatment. Embedding the LEDs directly in resin turned out to be unsatisfactory because the resin had to interface with the end of the LED that is formed in the shape of a lens so the lens effect was destroyed. The assembly depicted in FIGS. 8–11 obviates this problem and permits the scanning head to be cleaned without being damaged.

The column of LEDs 80 can be seen in the mounting assembly whose front elevation view is shown in FIG. 8. In this view, one is looking at the lens ends of the LEDs. As can be seen in FIG. 11, a typical LED comprises a cylindrical molded plastic body 310 having a rounded end 311 forming a lens and a molded base flange 312. The LEDs are all mounted on a printed circuit board 313 with their leads extending through so they can be soldered such as at 314. Each LED has a thin plastic tube 315 fitting over it rather tightly and each tube is closed on its end by a thin transparent plastic film 316. This film is sealed to sleeve 315. An airgap 317 exists between film 316 and the lens end 311 of the LED. Thus, the air permits the lens to have the usual effect of projecting the radiation axially of the LED without scattering the radiation. The LEDs are encapsulated in a clear resin 318 which extends over the end films 316 as well. Clear epoxy resin may be used for encapsulating the LEDs. In line with the column of LEDs, an oblong shaped plastic filter 319 is bonded to the front face of the encapsulating resin 318.

Printed circuit board 313 which carries a column of light emitting diodes is mounted on posts 320 as can be seen in FIGS. 9 and 10. The posts are secured to a backplate 321. A hollow body or housing, generally designated by the numeral 322, is fastened to backplate 321 with a plurality of machine screws 323. The housing has a perimetral wall 324 and its front face 325 has a vertically extending slot 326 behind which the column 80 of LEDs is located. Oblong plastic filter 319 is adhered to the front face 325 of the housing and to encapsulating resin behind it so that the radiation from the LEDs must pass through the filter.

In FIG. 10 one may see that the housing is filled with a clear resin 327 in front of and behind printed circuit board 313. Thus, the LEDs and all the parts within housing 322 are encapsulated in resin. Because of the thin end caps 316 on each sleeve 315 which surrounds each LED, the airspace 317 remains adjacent lens end 311 so radiation from the LEDs is not disbursed by the encapsulating resin. Note in FIG. 10 that there is a layer of resin 328 between the LEDs and filter 319.

The resin is injected into the housing through fittings such as the one marked 329 in FIG. 10. During the injection process, the assembly shown in FIG. 10 is inserted in a mold, not shown, which has a wall that interfaces with the front wall of the housing and thereby closes slot 326. At this time, filter 319 is adhered to the front of the assembly. Backing plate 321 is, however, present. Afterward the resin is injected, cooled and solidified.

Although the various conductors leading to the printed circuit board are not shown in FIGS. 8-11, it will be understood that they are disposed in the resin occupied space behind the printed circuit board marked 330 in FIG. 9. The conductors run into cables 331 and 332 which are held in the backplate 321 of the assembly with connectors 333 and 334. The connections are made to the elements on the printed circuit board, of course, before the board is fastened to the backing plate 321. When the board is secured, housing 322 is bolted onto backing plate 321. The cable connectors 333 and 334 are already secured in backing plate 321. The assembly is put into the mold for injecting the resin when it is in this condition.

How cob orientation is determined and how a cutter head jammed condition and reversal of the conveyor is handled will now be discussed in reference to the FIG. 12 flow chart and the FIG. 13 table which illustrate execution of part of the CPU algorithm.

Recall that in the earlier brief discussion of FIG. 4 orientation determination was said to be based on determining cob maximum diameter (Max D) and finding how many slices or scans it took to reduce the count by 2 on each side of Max D. This is the region that the CPU uses to determine orientation based on the fact that more slices would be scanned before the tapered small diameter or tip end of the cob was reduced by 2 counts than would be the case going in the direction of the larger diameter butt or stem end. In this example, when three slices are found to have the same number of counts, this uniformity is considered to be the Max D region. For convenience in describing the calculation the term "good number" (GN) will be used. GN=Max D−2.

The CPU also uses the total number of slices or scans made over the length of a cob in the orientation calculation. Short cobs which can go through the cutter head with either end first are not ejected and turned around as are normal length misoriented cobs or carrots or turnips or whatever is being processed in the machine.

Other matters to be aware of are that an assumption is made that no cob would be more than 144 scans or slices long, since the scans occur every one-eighth of an inch, so exceeding 144 would require an abnormally long 18 inch cob which is not to be expected. Also, if the time for 256 slices passes without a signal from jam switch 15, a cutter head jammed condition is assumed. The system will also calculate orientation correctly if one of the LEDs is dirty or permanently blocked.

Refer to FIG. 12. When the system is first turned on all start functions are set as indicated by block 1. B will stand for block hereafter. This sets the herein so called "dirty count" to 144 and sets the "scan count," "good scan count," "save flag," and "good number" (GN) to zero (0). These functions all occur in RAM locations.

The scan counts, that is, the binary number data representing the number of unblocked LEDs for each scan or slice as provided over bus lines 114 are inputtted at B2. The CPU deals with the number that are blocked. The counts are put in a RAM location called "keep." B2 is executed repeatedly. For every one-eighth inch scan an input of the number of blocked LEDs to B2 is made and the flow chart is followed as conditions dictate.

B3 determines if "keep" location=0. If not 0 go to B4. If 0 go to B11. Most of the events in the area of Bs 3 to 12 relate to the dirty condition indicator light, previously discussed and to the conveyor reversing procedure for a jam condition. If there are 144 scans that never return to zero, something has blocked the scanning LEDs for 144 increments. Keep will equal zero between counts.

Consider the path from decision B3 to B11 which is involved with dirty conditions and not primarily with cob orientation computation. Taking the YES path from B3 means that when "keep" was examined it was 0 which means there are no blocked LEDs. In B11, if the "dirty light" was on, it is turned off because input went to zero. Every time a new scan is zero B12 is reset to 144.

Now reconsider decision B3 and the case where the "keep" count was not equal to 0 and the NO path is taken to B4. This is the start of an explanation of how the dirty indication light operates. NO means there is a blocked LED. In B4 a check is made as to whether there has been a count down from 144 to 0. If there is a count down to 0, the YES path to B5 is taken which is the case when the scanner head is dirty. This means there have been 144 consecutive scans which never reached 0 so B5 indicates the dirty light should be on.

Now, as indicated in B6, any time there is a dirty condition, 1 is subtracted from the input count. This is subtracted from the RAM location "keep" since that is where the count was stored. The reason for the subtraction of 1 is to attempt to adjust or compensate if only one LED is blocked in which case the system is adapted to operate substantially normally anyhow. This allows the operator a little time before cleaning or other maintenance must be undertaken.

Assuming that 1 has been subtracted, go to B7. In B7 a check is made again to see if "keep" =0. The reason is that the binary number of blocked LEDs may actually be 1, but by subtracting 1 it would go to 0. So if it is zero, go to junction B, the junction between B7, B12 and B13. If it is not 0, take the path up to junction C, the junction between B7, B8 and B9 and execute B9 which is to "set cob is in system flag." Use of this is made solely in another algorithm that determines if a jam has occurred which would dictate running the conveyor through reverse and forward cycles a number of times as determined by the settings of switches 236 in FIG. 7. B9 can be disregarded insofar as the algorithm for determining butts and tips of cobs is concerned. Because there is a cob in the system run count B10 is set to zero.

Junction A is important for explanation purposes. It is a focal point where all functions converge. This point was actually reached at the time the first scan data was inputted.

Also note junction B where there is a merger of two different tests coming out of B3 and B7 which determined the "keep" is equal to 0. The difference between the two is that B11 and B12 are between them. Consider B11. When "keep"=0 was seen before, the path to B11 was taken and the dirty light was turned off because it did go to zero so there was no blockage. So dirty was set back to 144 again at B12.

If the test from B7 is YES, however, B11 and B12 are not executed because a dirty condition exists, so they are by-passed. Then B13 is executed in both this and the preceding case which execution is to "increment run count." "Run count" is related to the reversing procedure. Run count is checked to see if it is equal to 256. If YES, go to B15 to zero run count and to B16 to reset the "cob is in system flag" previously set in B9. What this means is that the zync pulse count had been run up to 256 without finding any cob in view which requires the "cob is in the system flag" to be set on the first indication of a cob being in the system. That is, the first time a scan count in "keep" greater than 0 is obtained, the flag is left set until 256 consecutive scans of zero blockage occur, indicating no cob in view. This is the entire function of blocks B9, B10, B13, B14, B15 and B16.

When B16 is executed, there is a return to junction A again. Now there is the B14 test again. So if run count is not equal to 256, the NO path is taken out of B14 to point A again.

In any case, disregarding the dirty light and reversing procedure, there is always a path leading to A if a count was made or not.

After point A there is decision block B17 where "keep" is tested for 0. If YES, go to B18. This is a determination that either the end of a cob has been reached, that is, after having gone through the process of inputting scan line data for a whole cob the end of it has been reached or a cob has not been seen as yet. Either case can exist on the line from B17 to B18.

B18 represents a check of the Max D RAM location. If a cob has not been in view, Max D will be zero at this time. Hence, the YES path will be taken out of decision B18 and an exit is made through Exit 1. Exit 1 is a termination or ignoring of a cob and just loops back to start B1.

Now consider decision B19. It compares the number of scan lines counted and stored in B23 (to be described momentarily) against the binary number produced by the switch group 230 settings in FIG. 7. As stated earlier, these switches establish the minimum length cob with which the orientation computation procedure will be concerned or the minimum that will be accepted. B19 asks "is cob longer than the shortest" that will be considered or accepted or in reality it asks if the number of lines or one-eighth inch increments scanned is greater than the number set in the switches. If YES, go to B20. If NO, go out Exit 1.

Now we have considered that the YES path out of B18 or the NO path out of B19 was taken in which case there is an exit out of Exit 1 and a loop back to Start B1 and the functions just reinitialize. The reason for this is that anything that occurred can be ignored in one sense because Max D as tested for in B18 has not been established yet or the cob was shorter than the minimum acceptable length as tested for in B19.

Consider B19 again and take the YES path which indicates that the cob under scan is longer than the acceptable minimum. The path from B19 is to B20. B20 is a test or examination of the table which is diagrammed in FIG. 13.

In the table the first and last entry of a scan are indicated. There is a scan for each cob length increment. Between the first and last entry there is a range X, a range Y and a range called Max D. Decision B20 indicates that, if in testing the table, there are more slices counted from the first good number (GN) input in the table to Max D than slice or scan counts to the last GN, the tip or small diameter end of the cob is leading. Summarily, if $X>Y$, the tip is leading. If $Y>X$, the butt is leading. Building the table will be described later.

Assume the YES path is taken out of B20 to B22. This results in the cob being ignored because it is indicative of the cob being oriented with its tip leading so it does not need to be turned end-for-end and the kicker paddle 32 is not actuated. So Exit 2 is taken which recycles the system.

However, if the NO path from decision B20 to B21 is in order, because the test next to B20 is answered negatively, the butt identification is put into the hardware. What the algorithm actually does at this time is to calculate where the approximate center of gravity of the cob is, based on the collected data. The center of gravity is determined so the distance from the center of gravity to the center of percussion of the kicker paddle or ejector 32 in FIG. 1 is known. We then know how many conveyor increments or pulses are needed to get the cob to the point where when hit by the paddle, the cob will be driven off straight or without having spin imparted to it. This number of increments is put in a RAM location and decremented each time a sync pulse indicative of one-eighth of an inch conveyor travel occurs. When decremented to zero, the drive signal from MV 286 in FIG. 7 occurs and the kicker solenoid coil 34 in FIG. 1 is pulsed followed by the signal from MV 291 pulsing the kicker paddle return solenoid coil 36. The time it takes the kicker to operate is accounted for by pulsing it just slightly before the center of gravity aligns with the impact point.

B21 is understood to include shift register operations. A few registers are present. When cob identification is put in hardware, there is no wait for decrementing to be completed. The functions are reset immediately. More than one register is used to enable data on several cobs to be stored as may be required when short cobs are being processed.

Building the cob identification profile and the FIG. 13 table will now be discussed. Recall that 3 input counts of identical value was taken as an indication of Max D. Then GN, Max D-2, is determined. At the start of a cob scan Max D and GN are zero.

Consider B17 in FIG. 12 again. B17 found that the binary numbers for the scans inputted to "keep" in B2 were greater than 0 which leads to B23.

In B23 the scan or slice count is incremented by 1 to get the total number of scans for the cob. This value is used for locating the center of gravity as discussed earlier.

B24 is a test flag for a RAM location which is zero at the start but serves as a terminator indicating that Max D and GN have been established and the scan values suddenly fell below GN. This means the range of cob slices that are to be used in the orientation computation has been passed. During the first times through, this will not happen so the NO path will be taken from B24 to B25.

B25 subtracts GN from "keep" which is the value inputted for the particular slice. B26 determines if the remainder is positive, that is, zero or greater. If YES go to B28. At start-up GN is 0 so that path will always be taken until a GN greater than 0 is established, GN being Max D−2. GN is always going up, never down.

If the YES path to B28 is taken, 1 is added to the good scan count which is a count of the number of slices in the FIG. 13 table, from the first input to the last input, which are GNs. GN is changing because as Max D is being reestablished the GN value is raised. Table entries that at first were GNs suddenly become bad numbers. So the first entry keeps moving up until Max D and GN are not reestablished any more as will be elaborated later.

Next B29 is a test for trying to establish Max D. It tests to see if this input is the same as the last one. If YES, go to B34. If NO, go to B30.

The first few times through the decision in B30 will be YES because Max D has not been established yet and it is zero. So the YES path leads to B31 where the "temporary Max D" count will be zeroed. It takes 3 consecutive inputs of the same value to establish Max D so the inputs are counted and called temporary Max D. Then go to B32 which says set temporary Max D to the new input because it is greater than the old Max D which was 0 so it is the latest temporary Max D which will become Max D after a value is received 3 times.

Between B32 and B33 is a junction D. In B30 a decision was made as to whether the new number was greater than or less than Max D. Note that we went through the function of zeroing temporary Max D and setting Max D to the new input based on whether it was equal to or greater than Max D.

B33 indicates the function of "put input into table." This means inserting this input value in the table being built which value is that from input B2. Then take Exit 5 back to B2 again for taking in a new value and do it repeatedly.

Divert attention now to B17 and assume it made a NO decision because the table has not been started yet and the B24 "save flag" is not set. Hence, go to B25 and B26, assume that the test result there is positive so go to B28 where 1 is added to the good scan count.

Now consider at B29 that the decision is YES, the count is the same as the last one and then test at B34 as to whether the input count is "equal to temporary Max D." It is because the previous one was established as temporary Max D and this input is equal and the same in this example. So go to B35 and add 1 to temporary Max D count.

In B36 there is a test for "is temporary Max D count=2." It is not in this example yet, it is only equal to 1 but has now been seen 2 times. So the decision is NO and a return is made to input B2 through Exit 6.

Now assume the next input has been tested at B29 and is the same as the last one. The same value has now been seen 3 times. So the test in B34 results in YES, this input is equal to temporary Max D and the result of adding 1 to temporary Max D in B35 is going to be YES at B36 so go to B37. In B37, Max D is set to this input value of 3 same values.

Now it is easy to establish GN in B38 which is Max D−2. For instance, if the Max D count was 8, GN=6.

B39 indicates removal of any input smaller than GN from the table that has been developing. In the process of building the table, some numbers smaller than GN were probably entered and they are not used in the butt versus tip computation. Now the first occurrence and last occurrence of Max D and the last entry of a GN in the table have been established. Any counts in the table larger than Max D would be single or double occurrences or they would have been established as Max D. The effect is to filter out any step changes which could be due to a bulging kernel, dirt fragments and so forth on the cob and eliminate these values from the tip orientation computation.

Now consider what happens if a negative number is obtained in B26. The NO path is followed and the "save flag" B27 is set. GN had been subtracted from "keep" and a negative number indicates the new number is smaller than the GN which has been established. So the "last entry" point has been reached in the table and the flag is set followed by go to B40.

In B40, Max D and GN are set to zero and Exit 4 goes back to B2 again so scan slice data input is continued but will no longer contribute to the table. This is because when B24 is reached, it checks the "save flag" and, if set, there is no way into the the table when falling below GN once it has been established. So no more scan lines are available for use in the butt-tip calculation.

B17 becomes the key now. Slices greater than 0 but not entering the table are still being inputted. Finally a zero occurs at B17, indicating the end of the cob. Then incrementing scan or slice count in B23 terminates because the cob length in terms of the number of vertical scans is established. There are no blocked LEDs at this time.

Continuing the path from B17 to B18 a test is made for Max D=0. The answer is NO, Max D has been established. So go to B19.

It is possible that at B19, after going through the whole routine, the cob length or size is smaller than minimum acceptable size. The NO exit from B19 indicates it can still be ignored.

Then go to B20 which, as indicated earlier, analyzes the table and establishes whether X or Y is larger in terms of numbers of scans and B21 or B22 function is executed depending on which is larger. Then the path is back to B1 in readiness for the next cob.

In summary: (1) Only GNs are used in the butt-tip calculations, (2) GN is established after Max D is determined, (3) Max D is established only after 3 consecutive inputs of the same value are sensed, (4) GN is always Max D−2, and (5) Any number smaller than GN is removed from the table.

If a table were built using all of the data that could be taken for a cob and if the analysis were carried out at the end, there would be a delay that would require inches of separation between cobs for the computer system to cope with it. Instead, in the procedure described above, analysis is made every one-eighth of an inch or every 3.6 ms or substantially in real time so the rate at which orientations can be determined and the production rate of the machine is maximized.

We claim:

1. In apparatus for determining the orientation of articles that are being transported in a longitudinal direction and have a maximum size portion and other portions having different sizes measured in a direction transverse to said longitudinal direction on at least one side of said maximum size portion, means for transporting said articles longitudinally in a predetermined path, scanning means including a plurality of radiation source means for projecting beams of radiation across said path, a plurality of radiation detector means disposed to receive radiation projected across said path, means for turning said radiation sources on and off in sequence to effect a scanning cycle and means for effecting repetitions of the cycle for successive increments of length of an article as it passes between said source and detector means, means controlled by said detector means to produce successive data words representative of the number of beams from said sources which are blocked and unblocked by said articles during each scan cycle to thereby indicate the sizes of said increments in said transverse direction, computer means programmed to use said data words for determining said maximum transverse size portion and for determining the number of scans on each side of said portion where said other portions respectively are reduced in size by the same amount relative to said maximum size portion, and means responding to said computer means determining that one of said other portions is smaller in said transverse direction than another of said other portions by acting on the said article to which the determination relates.

2. For use with a machine for stripping kernels from corn cobs comprising a cutter head into which said corn cobs are preferably inserted properly oriented for stripping with their smaller diameter tip ends leading and their butt ends trailing, and means for transporting said corn cobs axially in series toward said cutter head, in a predetermined axially directed path:

the improvement constituting means for determining if said cobs are properly oriented or misoriented, said determining means comprising scanning means including a plurality of radiation source means on one side of said path for projecting beams of radiation across said path, a corresponding plurality of radiation detector means on the other side of said path for receiving said beams of radiation which pass beyond the diameter of a corn cob in said path, means for turning said source means on and off in sequence to scan successive increments of length of a cob transversely as it is transported axially between said source and detector means, means controlled by said detector means to produce successive data words representative of the count of beams from said sources that are blocked and unblocked during each scan cycle and representative of the diameters of said increments of length, computer means programmed to use said data words for determining which of said tip end or said butt end of the cob in the beams is leading, and ejector means responsive to said computer means determining that said butt end is leading by diverting said cob from said series.

3. The apparatus as in claim 2 wherein said computer means is operative to identify a predetermined number of successive data words having equal count values to thereby establish the maximum diameter of the cob being scanned and being operative to determine on which axially extending side of said maximum diameter the most scans have occurred to reach a diameter which is smaller than said maximum diameter by a predetermined amount for determining said orientation.

4. The apparatus as in claim 2 wherein said computer means includes a microprocessor and an address bus and a data bus coupled therewith and memory means, means for producing sync pulses corresponding with successive increments of travel in the axial direction by said cob transport means, said means for turning said radiation source means on to effect a transverse scan being initiated in correspondence with occurrence of said sync pulses, and gate means controlled by said computer means to couple said scan data after each transverse scan to said data bus means for entry in said memory means.

5. The apparatus as in claim 4 including means for providing a binary word to said data bus means corresponding with the minimum cob length which is acceptable for said computer to effect activation of said ejector means.

6. The apparatus as in claim 5 wherein said means for providing a binary word comprises a plurality of switch means having one set of corresponding terminals connected in common for receiving a signal jointly and their other set of corresponding terminals connected to lines, respectively, of said data bus, said binary word being determined by selectively setting said switches opened and closed.

7. The apparatus as in claim 4 including first means for providing an indication of a possible jam condition due to cobs not having exited said cutter head in a predetermined time, and second means responsive to said first means by causing reversal of said cob transporting means for an interval followed by restoration of forward movement of said transporting means.

8. The apparatus as in claim 7 including means for providing a binary word to said data bus means corresponding with the number of reversals that are to be permitted under control of said computer means.

9. The apparatus as in claim 8 wherein said means for providing said binary word comprises a plurality of switches having input terminals for being connected to a voltage source and having output terminals, respectively, a corresponding plurality of gates for coupling said output terminals to lines of said data bus, respectively, said binary word being determined by selectively setting said switches opened and closed.

10. The apparatus as in claim 2 wherein said radiation source means are infrared radiation emitting diodes and said detector means are sensitive to infrared radiation.

11. For use with a machine including a device for performing an operation on elongated articles such as corn cobs which change diameter in at least one axial direction and are to be delivered to said device in one orientation and, means for transporting said articles axially toward said device in a predetermined path, the improvement comprising means for determining if said articles are properly oriented or misoriented comprising:

computer means including a processor, address and data bus lines coupled to said processor, and memory means, scanning means including a plurality of adjacent radiation sources on one side of said path for projecting radiation beams across said path, a corresponding plurality of radiation detector means for producing a series of signals, respectively, in response to intercepting said beams, selector means for pulsing said sources in sequence to scan successive increments of axial length of an article transversely to the axial direction as said article passes between said sources and said detector means, comparator means having an input for said series of signals and a reference voltage input and having output means, a first reference voltage signal source for providing a voltage signal and means for coupling said voltage signal to said input, means for converting signals from said comparator means to binary words representing the number of beams that are blocked and unblocked during scans of successive increments of said article, first gate means having input means for the respective digits of said binary data work and having output means coupled to lines, respectively, of said data bus, said processor being operative to control said gate means in correspondence with each scan to put said data words into memory by way of said data bus and being operative to use said data to determine the orientation of said article, sync pulse generator means for producing pulses for initiating scans of successive increments of article length, and means responding to a determination of misorientation being made by removing said article from said path.

12. The apparatus as in claim 11 wherein said processor is operative to determine the maximum diameter of said article in response to receiving a plurality of consecutive data words which have the same value which is taken as the maximum diameter, is operative to determine in how many incremental scans the values are reduced by a predetermined amount, and is operative to determine the approximate center of gravity of said article based on said data words for the length of said article, said means for acting on said article comprising means for applying a force to said article when said article has been transported to where said force may be applied in reference to said center of gravity.

13. The apparatus as in claim 12 including address decoder means having address input means coupled to said processor and a plurality of output means for signals which occur in correspondence with a unique address that is furnished by said processor, and means for coupling one of said output means to said first gate means for controlling said first gate means to input said data words.

14. The apparatus as in claim 13 including means controlled by one of said signals from said decoder means to provide a binary word to said data bus means corresponding with minimum article length which is acceptable for said computer to activate said means for acting on said articles.

15. The apparatus as in claim 13 including a plurality of switch means having corresponding input terminals connected in common and individual output terminals coupled to lines, respectively, of said data bus, and means for coupling one of said output signals from said decoder means to said common connection so that by setting said switches variously opened and closed a binary word will be supplied to said data bus and processor corresponding with the shortest length of article which is acceptable for said processor to effect activation of said means for acting on said article.

16. The apparatus as in claim 13 wherein means are provided for servicing a jam condition of said means for performing said operation, said means for servicing comprising jam switch means having two states indicative, of said operation being and not being performed, second gate means interposed between said jam switch means and a data bus line to enable said processor to determine the state of said jam switch means, latch means having output means and having input means coupled with data bus lines, respectively, for receiving binary words from said processor, said latch means being controlled by a signal from said decoder means in coincidence with an address to said decoder means to provide signals to the output means of said latch means in correspondence with bytes of data being provided by said processor to said input means of said latch means, said bytes of data corresponding respectively with signals on said latch output means for causing reversal to clear said jam condition and for causing forward driving of said operation performing means and for controlling forward driving of said article transporting means, and further input means to said latch means for providing by way of said data bus lines bytes from said processor indicative of said jam condition not being cleared in a predetermined number of reversals.

17. The apparatus as in claim 16 including third gate means each having output means coupled to data bus lines, respectively, and each having input means, a switch in series with the input means of each of said third gate means, respectively, said switches being selectively settable opened and closed to cause said third gate means to form a binary word on their output means corresponding with the number of reversals permitted.

18. The apparatus as in claim 11 comprising means for testing including a second reference voltage source for producing a higher voltage than the voltage of said first source, means for coupling said second source to said reference voltage input and for concurrently uncoupling said first source from said input to thereby determine if the magnitudes of the signals in said series of signals resulting from scanning are above a minimum magnitude, and means for effecting input of the binary words produced to the inputs of said first gate means.

19. The apparatus as in claim 18 including a plurality of condition indicating means, decoder means having input means coupled with said processor for receiving an address code and having a plurality of output terminals, said decoder means being operative to receive unique addresses code words and produce a corresponding signal on one of its output terminals, latch means having input means for receiving binary words indicative of functions of the circuitry during a test and having a plurality of output terminals coupled to said indicating means, said latch means being enabled by one of the output signals from said decoder means to accept said data related to functions for controlling said condition indicating means.

20. The apparatus in claim 11 wherein said radiation sources are infrared radiation emitters and said detectors are responsive to infrared radiation.

21. The apparatus as in claim 11 wherein said radiation sources each have an integral lens portion for forming its radiation in a beam, means for supporting said radiation sources to present their respective lenses generally in the same direction, a sleeve surrounding each of said radiation sources and lenses, respectively, said sleeves each having a radiation transmissive end closure in spaced relation with the lens of the source which the sleeve surrounds, and radiation transmissive encapsulating material overlaying said closures.

* * * * *